(12) United States Patent
Di et al.

(10) Patent No.: US 12,406,524 B2
(45) Date of Patent: Sep. 2, 2025

(54) FINGERPRINT RECOGNITION METHOD AND APPARATUS

(71) Applicant: HONOR DEVICE CO., LTD., Shenzhen (CN)

(72) Inventors: Haoxuan Di, Shenzhen (CN); Danhong Li, Shenzhen (CN); Mingjin Guo, Shenzhen (CN); Junlong Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/838,073

(22) PCT Filed: May 5, 2023

(86) PCT No.: PCT/CN2023/092336
§ 371 (c)(1),
(2) Date: Aug. 13, 2024

(87) PCT Pub. No.: WO2024/037057
PCT Pub. Date: Feb. 22, 2024

(65) Prior Publication Data
US 2025/0037500 A1 Jan. 30, 2025

(30) Foreign Application Priority Data
Aug. 18, 2022 (CN) .................. 202210994178.7

(51) Int. Cl.
*G06V 40/12* (2022.01)
*G06V 10/24* (2022.01)
*G06V 10/74* (2022.01)

(52) U.S. Cl.
CPC ........ *G06V 40/1365* (2022.01); *G06V 10/242* (2022.01); *G06V 10/761* (2022.01); *G06V 40/1347* (2022.01)

(58) Field of Classification Search
CPC .. G06V 40/1365; G06V 40/12; G06V 10/242; G06V 10/761
See application file for complete search history.

(56) References Cited

U.S. PATENT DOCUMENTS 7,340,080 B2   3/2008   Liu
10,032,062 B2  7/2018   Kim et al.
(Continued)

FOREIGN PATENT DOCUMENTS

CN     1564186 A    1/2005
CN   101329727 A   12/2008
(Continued)

OTHER PUBLICATIONS

Yagn et al: "Fast fingerprint matching based on multi-structure similarity", Journal of Shandong University (Engineering Edition), 2010, 40(02), Apr. 16, 2010, pp. 11-18.
(Continued)

*Primary Examiner* — Lixi C Simpson
(74) *Attorney, Agent, or Firm* — WOMBLE BOND DICKINSON (US) LLP

(57) ABSTRACT

The method includes: obtaining features of L key points of a first fingerprint image; determining G pairs of key points based on the L key points of the first fingerprint image and L key points of a first fingerprint template; sorting the G pairs of key points based on the first distance parameter corresponding to each pair of key points, and determining N pairs of key points from the G pairs of key points that are sorted; determining a first rotation matrix using the N pairs of key points, and rotating the first fingerprint image based on the first rotation matrix to obtain a second fingerprint image, where the second fingerprint image is in a same
(Continued)

direction as the first fingerprint template; and performing similarity matching using the second fingerprint image and the first fingerprint template.

20 Claims, 12 Drawing Sheets

(56) References Cited

U.S. PATENT DOCUMENTS

| | | | |
|---|---|---|---|
| 10,339,360 B2 | 7/2019 | Zhou | |
| 11,373,439 B1 | 6/2022 | Lucas | |
| 11,710,342 B2 | 7/2023 | Zheng | |
| 2009/0310831 A1* | 12/2009 | Zhang | G06V 40/1353 382/125 |
| 2012/0195478 A1* | 8/2012 | Hsu | G06V 40/1371 382/125 |
| 2013/0051607 A1 | 2/2013 | Highley | |
| 2018/0018499 A1 | 1/2018 | Lei et al. | |
| 2020/0057910 A1* | 2/2020 | Aoki | G06V 10/757 |

FOREIGN PATENT DOCUMENTS

| | | | |
|---|---|---|---|
| CN | 101751555 A | 6/2010 | |
| CN | 101777130 A | 7/2010 | |
| CN | 102262730 A | 11/2011 | |
| CN | 102819729 A | 12/2012 | |
| CN | 104820983 A | 8/2015 | |
| CN | 105205439 A | 12/2015 | |
| CN | 105335731 A | 2/2016 | |
| CN | 105868597 A | 8/2016 | |
| CN | 106056037 A | 10/2016 | |
| CN | 107609375 A | 1/2018 | |
| CN | 107748877 A | 3/2018 | |
| CN | 109740633 A | 5/2019 | |
| CN | 109934180 A | 6/2019 | |
| CN | 110555348 A | 12/2019 | |
| CN | 110610132 A | 12/2019 | |
| CN | 112507987 A | 3/2021 | |
| CN | 112560818 A | 3/2021 | |
| CN | 113033257 A | 6/2021 | |
| CN | 107545217 B | 7/2021 | |
| CN | 113496183 A | 10/2021 | |
| CN | 114495180 A | 5/2022 | |
| CN | 113496183 B | 2/2023 | |

OTHER PUBLICATIONS

Fu et al: "An Fingerprint Matching Algorithm Based on Minutia Global Confidence", Pattern Recognition and Artificial Intelligence, 2014, 27(09), Sep. 15, 2014, pp. 835-840.

A. K. Jain, Jianjiang Feng, A. Nagar and K. Nandakumar, "On matching latent fingerprints," 2008 IEEE Computer Society Conference on Computer Vision and Pattern Recognition Workshops, Anchorage, AK, USA, 2008, pp. 1-8.

Le et al: "Speeding up and Enhancing a Large-Scale Fingerprint Identification System on GPU*", Journal of Information and Telecommunication 2 (2): 147-62, Nov. 26, 2017.

Edward K. Wong, Yao Wang, Syng-Yup Ohn: "Fingerprint verification using, direction images and local Features", SPIE, PO Box 10 Bellingham WA 98227-0010, USA, vol. 7251, XP040494247, Feb. 2, 2009 (Feb. 2, 2009), pp. 8.

* cited by examiner

FINGERPRINT RECOGNITION METHOD AND APPARATUS

CROSS-REFERENCE TO RELATED APPLICATIONS

This application is a national stage of International Application No. PCT/CN2023/092336, filed on May 5, 2023, which claims priority to Chinese Patent Application No. 202210994178.7, filed on Aug. 18, 2022. The disclosures of both of the aforementioned applications are hereby incorporated by reference in their entireties.

TECHNICAL FIELD

This application relates to the field of biological recognition, and specifically, to a fingerprint recognition method and apparatus.

BACKGROUND

With the popularization of a smart terminal, a fingerprint recognition technology has rapidly developed in the field of terminals. Particularly when a user wears a face mask, compared with face unlocking, fingerprint unlocking is indispensable. In a current fingerprint matching method, a feature point is extracted based on a fingerprint image, and all feature points extracted are used for matching, which has specific impact on a fingerprint unlocking speed. Therefore, how to effectively increase the fingerprint unlocking speed becomes a problem to be urgently resolved.

SUMMARY

In view of this, this application provides a fingerprint recognition method and apparatus, a computer-readable storage medium, and a computer program product, which can increase a fingerprint recognition speed and greatly improve user experience in fingerprint recognition.

According to a first aspect, a fingerprint recognition method is provided. The method is applied to an electronic device. The method includes:

acquiring a first fingerprint image;

obtaining features of L key points of the first fingerprint image, where L is an integer greater than or equal to 2;

determining G pairs of key points based on the L key points of the first fingerprint image and L key points of a first fingerprint template, where each pair of key points is a point pair formed when a key point of the first fingerprint image is matched with a key point of the first fingerprint template, a first distance parameter corresponding to each pair of key points is less than a first distance threshold, the first distance parameter is used to represent a distance between the key point of the first fingerprint image and the key point of the first fingerprint template, features of the L key points of the first fingerprint template are stored in a fingerprint template library, and G is an integer less than or equal to L;

sorting the G pairs of key points based on the first distance parameter corresponding to each pair of key points;

determining N pairs of key points from the G pairs of key points that are sorted, where N is an integer less than or equal to G;

determining a first rotation matrix using the N pairs of key points, where the first rotation matrix includes a translation parameter and an angle parameter, the angle parameter is used to represent a rotation angle of the first fingerprint image to the first fingerprint template, and the translation parameter is used to represent a translation distance of the first fingerprint image to the first fingerprint template;

obtaining a second fingerprint image, where the second fingerprint image is obtained by rotating the first fingerprint image based on the first rotation matrix, and the second fingerprint image is in a same direction as the first fingerprint template; and performing similarity matching using the second fingerprint image and the first fingerprint template.

The first fingerprint image is a to-be-verified fingerprint image.

The method may be performed by a terminal device or a chip in a terminal device. Based on the foregoing solution, the features of the L key points of the first fingerprint image are first obtained. Then, the G pairs of key points are determined based on the features of the L key points of the to-be-verified fingerprint image and the features of the L key points of the fingerprint template. The first distance parameter corresponding to each pair of key points is less than the first distance threshold. The first distance parameter is used to represent the distance between the key point of the first fingerprint image and the key point of the first fingerprint template. Next, the G pairs of key points are sorted, and the N pairs of key points are determined from the G pairs of key points that are sorted. Later on, the first rotation matrix is determined using the N pairs of key points, and the to-be-verified fingerprint image is rotated based on the first rotation matrix to obtain the second fingerprint image. Finally, similarity matching is performed using the second fingerprint image on an extracted to-be-verified fingerprint feature and the fingerprint template. This process helps increase a fingerprint recognition speed, and greatly improves user experience in fingerprint recognition. Furthermore, features of L key points of each fingerprint template are stored in the fingerprint template library. Compared with a method of storing all feature points, this can reduce storage space occupied by the fingerprint templates, which helps save space of the electronic device.

In a possible implementation, before the obtaining a second fingerprint image, the method further includes:

determining, based on the angle parameter and the translation parameter, whether the first rotation matrix is effective; and when the first rotation matrix is ineffective, determining another first rotation matrix using the N pairs of key points.

The determining a second fingerprint image includes:

when the first rotation matrix is effective, obtaining the second fingerprint image.

Therefore, determining about effectiveness of the first rotation matrix is set, which can improve reliability of a fingerprint verification process, and greatly reduce a fail accept FA risk to reduce a fail accept rate FAR.

In a possible implementation, the translation parameter includes a horizontal translation parameter and a vertical translation parameter. The determining, based on the angle parameter and the translation parameter, whether the first rotation matrix is effective includes:

determining whether the horizontal translation parameter is less than a first translation threshold or whether the vertical translation parameter is less than a second translation threshold;

determining whether a trigonometric function value is greater than an angle threshold. where the trigonometric function value is determined based on the angle parameter;

when the horizontal translation parameter is less than the first translation threshold and the trigonometric function value is greater than the angle threshold, or when the vertical translation parameter is less than the second translation threshold and the trigonometric function value is greater than the angle threshold, determining whether first distance parameters corresponding to H pairs of key points are all less than a second distance threshold, where H is greater than a first quantity, and H is an integer less than or equal to N;

when the second distance parameters corresponding to the H pairs of key points are all less than the second distance threshold, determining whether a first variance is greater than a first variance threshold or whether a second variance is greater than a second variance threshold; and when the first variance is greater than the first variance threshold or the second variance is greater than the second variance threshold, determining that the first rotation matrix is effective; or when the first variance is not greater than the first variance threshold and the second variance is not greater than the second variance threshold, determining that the first rotation matrix is ineffective.

Therefore, effectiveness of the first rotation matrix is determined in the foregoing specific manner, to provide a basis for obtaining an effective first rotation matrix.

In a possible implementation, the sorting the G pairs of key points based on the first distance parameter corresponding to each pair of key points includes:

sorting the G pairs of key points in order of small to large values of the first distance parameters.

The N pairs of key points are first N pairs of key points in the G pairs of key points that are sorted.

For example, the G pairs of key points are sorted in order of the small to large values of the first distance parameters, and the N pairs of key points ranked higher (or top-N key point pairs) are selected from the G pairs of key points that are sorted. The N pairs of key points ranked higher include N key points of the first fingerprint image and N key points of the first fingerprint template, which are corresponding. Selecting the N pairs of key points in this manner can select high-quality key points to prepare for subsequent calculation of a rotation matrix.

In a possible implementation, the performing similarity comparison using the second fingerprint image and the first fingerprint template includes:

sequentially traversing a key point of the second fingerprint image and the key point of the first fingerprint template;

determining whether a black similarity parameter is greater than a first threshold, where the black similarity parameter is used to represent a quantity of corresponding pixels that are black in the second fingerprint image and the first fingerprint template;

determining whether a white similarity parameter is greater than a second threshold. where the white similarity parameter is used to represent a quantity of corresponding pixels that are white in the second fingerprint image and the first fingerprint template; and when the black similarity parameter is greater than the first threshold and the white similarity parameter is greater than the second threshold, determining that matching succeeds.

Statistics on a total quantity of pixels that are black in the second fingerprint image and the first fingerprint template and a total quantity of pixels that are white in the second fingerprint image and the first fingerprint template is collected. When the total quantity of pixels that are black in the second fingerprint image and the first fingerprint template and the total quantity of pixels that are white in the second fingerprint image and the first fingerprint template are both greater than the corresponding thresholds, it is considered that the second fingerprint image is successfully matched with the first fingerprint template. Compared with an existing matching manner, the foregoing black/white similarity determining manner can greatly improve recognition accuracy, reduce complexity in matching, reduce matching time, and significantly improve fingerprint recognition experience.

In a possible implementation, the performing similarity matching using the second fingerprint image and the first fingerprint template includes:

determining a second distance parameter, where the second distance parameter is used to represent a distance between a key point of the second fingerprint image and the key point of the first fingerprint template;

determining whether second distance parameters corresponding to M pairs of key points are all less than a third distance threshold, where M is greater than a second quantity; and when the second distance parameters corresponding to the M pairs of key points are all less than the third distance threshold, determining that matching succeeds.

Statistics on a quantity of pairs of key points whose second distance parameters are less than the third distance threshold is collected. When the quantity of pairs of key points is greater than the second quantity, it is considered that the second fingerprint image is successfully matched with the first fingerprint template.

Compared with an existing matching manner, collecting the statistics on the quantity of key points whose second distance parameters are less than the third distance threshold for similarity determining helps reduce complexity in matching, reduce matching time, and significantly improve fingerprint recognition experience.

In a possible implementation, the method further includes:

when the second fingerprint image is not successfully matched with the first fingerprint template, performing matching using the first fingerprint image and a second fingerprint template in the fingerprint template library; where features of L key points of the second fingerprint template are stored in the fingerprint template library.

The fingerprint template library may store a plurality of fingerprint templates, and features of L key points of each fingerprint template are stored. In a fingerprint verification process, the fingerprint templates stored in the fingerprint template library may be traversed until the first fingerprint image is successfully matched.

In a possible implementation, the features of the L key points of the first fingerprint template are obtained in the following manner;

acquiring a third fingerprint image;

preprocessing the third fingerprint image to obtain a preprocessed fingerprint image; and extracting the features of the L key points of the first fingerprint template based on the preprocessed fingerprint image.

Therefore, features stored in the fingerprint template library are features of L key points of a fingerprint image, not all features extracted. This helps save memory space.

In a possible implementation, the method further includes:

displaying a first interface, where the first interface includes a first option, and the first option is used to select to turn on or turn off a fingerprint matching optimization function.

Therefore, embodiments of this application further provide a switch option for the fingerprint matching optimization function, for a user to select to turn on or turn off the fingerprint matching optimization function.

According to a second aspect, a fingerprint recognition apparatus is provided, including units configured to perform the method in any implementation of the first aspect. The apparatus may be a terminal (or a terminal device), or a chip in a terminal (or a terminal device). The apparatus includes an input unit, a display unit, and a processing unit.

When the apparatus is the terminal, the processing unit may be a processor, the input unit may be a communication interface, and the display unit may be a graphic processing module and a screen. The terminal may further include a memory. The memory is configured to store computer program code. When the processor executes the computer program code stored in the memory; the terminal is enabled to perform the method in any implementation of the first aspect.

When the apparatus is the chip in the terminal, the processing unit may be a logic processing unit inside the chip, the input unit may be an input interface, a pin, a circuit, or the like, and the display unit may be a graphic processing unit inside the chip. The chip may further include a memory. The memory may be a memory (for example, a register or a cache) in the chip, or a memory (for example, a read-only memory or a random access memory) located outside the chip. The memory is configured to store computer program code. When the processor executes the computer program code stored in the memory, the chip is enabled to perform the method in any implementation of the first aspect.

According to a third aspect, a computer-readable storage medium is provided. The computer-readable storage medium stores computer program code. When the computer program code is run by a fingerprint recognition apparatus, the apparatus is enabled to perform the method in any implementation of the first aspect.

According to a fourth aspect, a computer program product is provided. The computer program product includes computer program code. When the computer program code is run by a fingerprint recognition apparatus, the apparatus is enabled to perform the method in any implementation of the first aspect.

DESCRIPTION OF EMBODIMENTS

Figure 1:
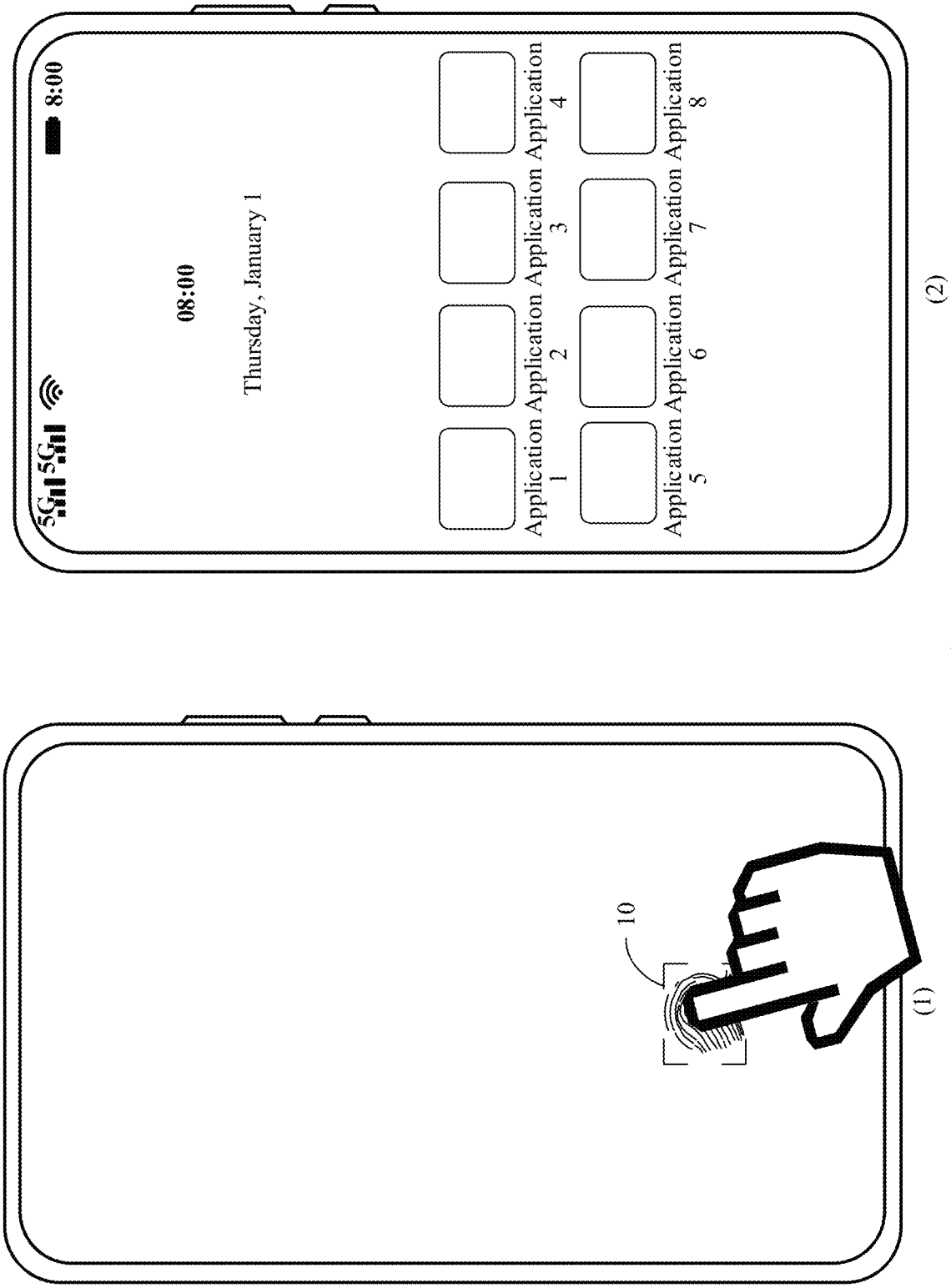
FIG. 1 is an example diagram of an application scenario according to an embodiment of this application.

The following describes technical solutions in embodiments of this application with reference to the accompanying drawings.

A fingerprint recognition method provided in an embodiment of this application may be applied to an electronic device with a fingerprint recognition function. For example, the electronic device may be a mobile phone, a tablet computer, a notebook computer, a wearable device, a multimedia player, an e-book reader, a personal computer, a personal digital assistant (personal digital assistant, PDA), a netbook, an augmented reality (augmented reality, AR) device. or a virtual reality (virtual reality, VR) device. A specific form of the electronic device is not limited in this application.

By way of example but not limitation, when the electronic device is a wearable device. the wearable device may be a general term for wearable devices, such as glasses, gloves, watches, clothing, and shoes, developed by applying wearable technologies in intelligent designs of daily wear. The wearable device is a portable device that is directly worn on a body or integrated into clothes or an accessory of a user, and may acquire biological feature data of the user. The wearable device not only is a hardware device but also realizes powerful functions through software support. data interaction, and cloud interaction. In an implementation, a wearable smart device includes a device, for example, a smartwatch or smart glasses, that is comprehensive in function and large in size and that can perform some or all functions without relying on a smartphone. In another implementation, a wearable smart device may be a device, for example, a smart band including an unlocked touchscreen or a smart jewelry, that focuses on a specific type of application function and needs to be used in cooperation with another device (for example, a smartphone).

An application scenario of fingerprint recognition is not specifically limited in this embodiment of this application, and this embodiment of this application is applied to all scenarios involving recognition with a fingerprint, for example, unlocking, payment, or identity authentication performed by the user using a fingerprint.

This embodiment of this application may be applied to an optical fingerprint recognition scenario. Optical fingerprint recognition mainly uses principles of light reflection and refraction. When a finger presses a screen, the screen is turned on and emits light, the light illuminates a fingerprint, and then the fingerprint is transmitted to a sensor under the screen through reflection and refraction for recognition. The fingerprint recognition scenario is not specifically limited in this embodiment of this application, and this embodiment of this application may also be appropriately applied to other fingerprint recognition scenarios, for example. ultrasonic fingerprint recognition and capacitive fingerprint recognition.

It may be understood that a location of a fingerprint module is not specifically limited in this embodiment of this application. For example, if an optical fingerprint recognition technology is used, the fingerprint module may be disposed under the screen (or a touchscreen) of the electronic device, that is, implements in-screen fingerprint recognition. For another example, the fingerprint module may alternatively be disposed on the back or side of the electronic device.

FIG. 1 is a diagram of an application scenario according to an embodiment of this application. For example, the electronic device is a mobile phone. The mobile phone uses in-screen fingerprint unlocking. As shown in (1) in FIG. 1, the user presses a fingerprint unlocking region 10 of the screen to try to perform fingerprint unlocking. After the user presses the fingerprint unlocking region 10, the mobile phone matches an acquired fingerprint with a fingerprint template pre-stored by the user. If matching succeeds, the screen of the mobile phone is successfully unlocked.

It should be understood that the fingerprint unlocking region 10 shown in (1) in FIG. 1 is merely an example for description, and this embodiment of this application is not limited thereto. In fact, the fingerprint unlocking region 10 may be located in another region of the screen, for example, a screen region close to a power button.

It should be further understood that fingerprint unlocking in (1) in FIG. 1 is described using in-screen fingerprint unlocking as an example, and this embodiment of this application is not limited thereto. For example, this embodiment of this application is also applied to back fingerprint unlocking of the mobile phone.

It should be further understood that the user may press the fingerprint unlocking region 10 of the screen with a finger when inputting a fingerprint. In a fingerprint input process, the user may press the fingerprint unlocking region 10 of the screen, to implement fingerprint input. In this embodiment of this application, features of L key points may be obtained based on an acquired fingerprint image, and the features of the L key points of the fingerprint image are stored in a fingerprint template library.

After the fingerprint of the user is successfully matched, a home screen of the mobile phone may be entered. In a possible case, for example, the mobile phone displays an interface shown in (2) in FIG. 1 after successful fingerprint unlocking, where icons of a plurality of applications, for example, an application 1 to an application 8, are displayed on the interface. Certainly, the interface shown in (2) in FIG. 1 is merely a possible case, and this embodiment of this application is not limited thereto.

It should be understood that the scenario in FIG. 1 only schematically describes one application scenario of this application, this does not constitute a limitation on this embodiment of this application, and this application is not limited thereto.

Figure 2:
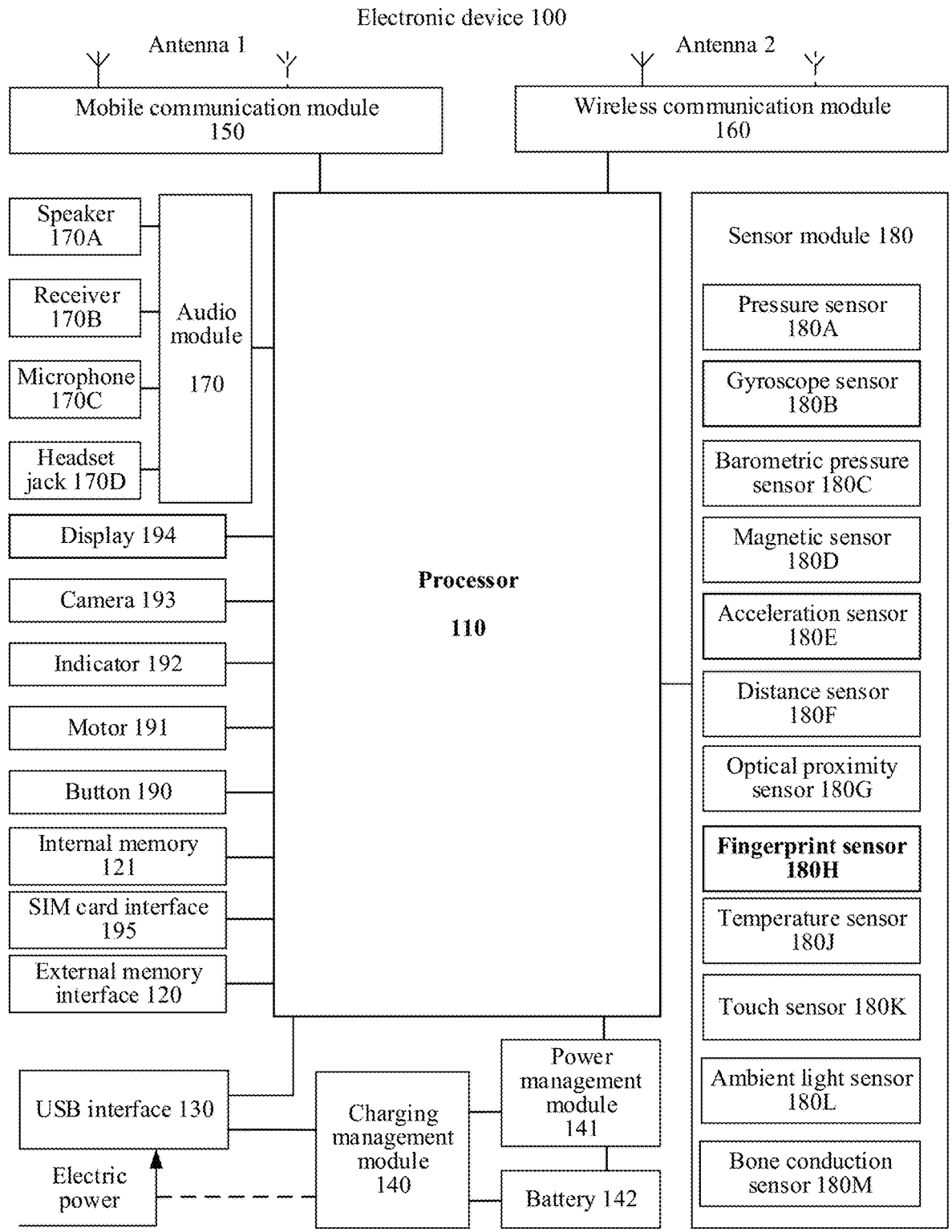
FIG. 2 is a diagram of a hardware system of an electronic device applied to this application.
Figure 3:
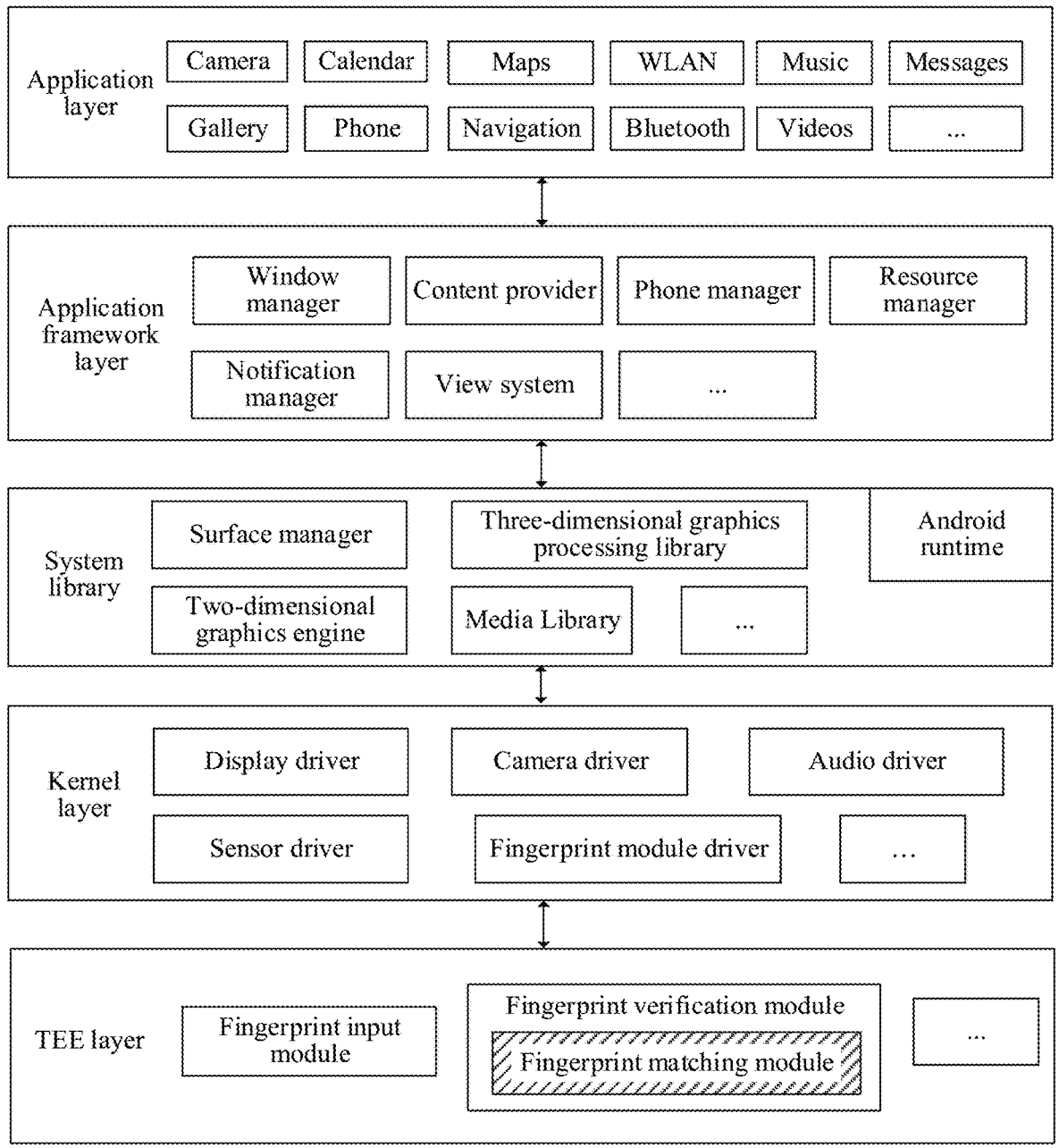
FIG. 3 is a diagram of a software system of an electronic device applied to this application.

The following describes, with reference to FIG. 2 and FIG. 3, a hardware system and a software architecture that are applied to this embodiment of this application.

FIG. 2 shows a hardware system of an electronic device applied to this application.

An electronic device 100 may be a mobile phone, a smartscreen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 2 does not constitute a specific limitation on the electronic device 100. In some other embodiments of this application, the electronic device 100 may include more or fewer components than those shown in FIG. 2, the electronic device 100 may include a combination of some of the components shown in FIG. 2, or the electronic device 100 may include subcomponents of some of the components shown in FIG. 2. For example, the optical proximity sensor 180G shown in FIG. 2 may be optional. The components shown in FIG. 2 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent devices, or may be integrated devices.

In some embodiments, the processor 110 is configured to: acquire a first fingerprint image through the fingerprint sensor 180H; obtain features of L key points of the first fingerprint image, where L is an integer greater than or equal to 2; determine G pairs of key points based on the L key points of the first fingerprint image and L key points of a first fingerprint template, where each pair of key points is a point pair formed when a key point of the first fingerprint image is matched with a key point of the first fingerprint template, a first distance parameter corresponding to each pair of key points is less than a first distance threshold, the first distance parameter is used to represent a distance between the key point of the first fingerprint image and the key point of the first fingerprint template, features of the L key points of the first fingerprint template are stored in a fingerprint template library, and G is an integer less than or equal to L; sort the G pairs of key points based on the first distance parameter corresponding to each pair of key points; determine N pairs of key points from the G pairs of key points that are sorted, where N is an integer less than or equal to G; determine a first rotation matrix using the N pairs of key points, where the first rotation matrix includes a translation parameter and an angle parameter, the angle parameter is used to represent a rotation angle of the first fingerprint image to the first fingerprint template, and the translation parameter is used to represent a translation distance of the first fingerprint image to the first fingerprint template; obtain a second fingerprint image, where the second fingerprint image is obtained by rotating the first fingerprint image based on the first rotation matrix, and the second fingerprint image is in a same direction as the first fingerprint template; and perform similarity matching using the second fingerprint image and the first fingerprint template.

The controller may generate an operation control signal based on an instruction operation code and a timing signal, to implement control on instruction fetching and execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

A connection relationship between the modules shown in FIG. 2 is merely an example for description, and does not constitute a limitation on a connection relationship between the modules of the electronic device 100. Optionally, the modules of the electronic device 100 may alternatively use a combination of a plurality of connection manners in the foregoing embodiment.

The electronic device 100 may implement a display function through the GPU, the display 194, and the application processor. The GPU is a microprocessor for image processing and connects the display 194 to the application processor. The GPU is configured to perform mathematical and geometric computation for graphic rendering. The processor 110 may include one or more GPUs that execute program instructions to generate or change display information.

The display 194 may be configured to display an image or a video. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light-emitting diode (quantum dot light-emitting diodes, QLED). In some embodiments, the electronic device 100 may include one or N displays 194, where N is a positive integer greater than 1.

The electronic device 100 may implement a shooting function through the ISP, the camera 193, the video codec, the GPU, the display 194, the application processor, and the like.

The ISP is configured to process data fed back by the camera 193. For example, during photographing, a shutter is opened, and light is transmitted to a photosensitive element of the camera through a lens. An optical signal is converted into an electrical signal. The photosensitive element of the camera transmits the electrical signal to the ISP for processing, to convert the electrical signal into a visible image. The ISP may perform algorithm optimization on noise, brightness, and a color of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format of red green blue (red green blue, RGB), YUV, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 performs frequency selection, the digital signal processor is configured to perform Fourier transform and the like on frequency energy.

The electronic device 100 may implement an audio function such as music playback and sound recording through the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed in the display 194. There are many types of pressure sensors 180A, for example, a resistive pressure sensor, an inductive pressure sensor, or a capacitive pressure sensor. The capacitive pressure sensor may include at least two parallel plates with conductive materials. When force acts on the pressure sensor 180A, capacitance between electrodes changes, and the electronic device 100 determines pressure strength based on a change in the capacitance. When a touch operation is performed on the display 194, the electronic device 100 detects the touch operation based on the pressure sensor 180A. The electronic device 100 may also calculate a touch location based on a detected signal of the pressure sensor 180A.

The fingerprint sensor 180H is configured to acquire a fingerprint. The electronic device 100 may use a feature of the acquired fingerprint to implement functions such as unlocking. accessing an application lock, photographing, and receiving a call. The fingerprint sensor 180H may be implemented by a fingerprint module. In some embodiments, the fingerprint module is an optical fingerprint module.

The touch sensor 180K is also referred to as a touch device. The touch sensor 180K may be disposed on the display 194. The touch sensor 180K and the display 194 form a touchscreen. and the touchscreen is also referred to as a touch control screen. The touch sensor 180K is configured to detect a touch operation performed on or near the touch sensor. The touch sensor 180K may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from that of the display 194.

The button 190 includes a power button and a volume button. The button 190 may be a mechanical button, or may be a touch button. The electronic device 100 may receive a key input signal and implement a function related to the key input signal.

The motor 191 may generate a vibration. The motor 191 may be configured to provide an incoming call prompt, and may be further configured to provide touch feedback. The motor 191 may generate different vibration feedback effects for touch operations performed on different applications. The motor 191 may also generate different vibration feedback effects for touch operations performed on different regions of the display 194. Different application scenarios (for example, a time reminder, information receiving, an alarm clock, and a game) may correspond to different vibration feedback effects. Touch vibration feedback effects may be customized.

The hardware system of the electronic device 100 is described in detail above. A software system of the electronic device 100 is described below. The software system may use a layered architecture, an event-driven architecture, a microkernel architecture, a microservice architecture, or a cloud architecture. The layered architecture is used as an example in this embodiment of this application to describe an example of the software system of the electronic device 100.

As shown in FIG. 3, the software system using a layered architecture is divided into several layers, and each layer has a clear role and task. The layers communicate with each other through a software interface. In some embodiments, the software system may be divided into five layers: an application layer, an application framework layer, an Android runtime (Android Runtime) and system library, a kernel layer, and a trusted execution environment (trusted execution environment, TEE) layer from top to bottom.

The application layer may include applications such as Camera, Gallery, Calendar, Phone, Maps, Navigation, WLAN, Bluetooth, Music, Videos, and Messages.

The application framework layer provides an application programming interface (application programming interface, API) and a programming framework for the applications at the application layer. The application framework layer may include some predefined functions.

For example, the application framework layer includes a window manager, a content provider, a view system, a phone manager, a resource manager, and a notification manager.

The window manager is configured to manage a window application. The window manager may obtain a display size, determine whether there is a status bar, perform screen locking, and take a screenshot.

The content provider is configured to store and obtain data, and make the data accessible to an application. The data may include a video, an image, audio, calls made and answered, a browsing history and a bookmark, and a phone book.

The view system includes visual controls such as a text display control and a picture display control. The view system may be configured to construct an application. A display interface may include one or more views. For example, a display interface including an SMS message notification icon may include a text display view and a picture display view.

The phone manager is configured to provide a communication function for the electronic device 100, for example, management of a call status (answering or declining).

The resource manager provides various resources for an application, such as a localized string, an icon, a picture, a layout file, and a video file.

The notification manager enables an application to display notification information in the status bar, which may be used to convey a notification-type message and may automatically disappear after a short stay without user interaction. For example, the notification manager is configured to provide a notification of download completion and a message notification. The notification manager may further manage a notification that appears in the status bar at a top of the system in a form of a graph or scroll bar text, for example, a notification of an application running in the background. The notification manager may further manage a notification that appears on the screen in a form of a dialog window. For example, text information is displayed in the status bar, a prompt tone is made, the electronic device vibrates, or an indicator light blinks.

The Android runtime includes a kernel library and a virtual machine. The Android runtime is responsible for scheduling and managing an Android system.

The kernel library includes two parts: one part is a function that needs to be invoked by a Java language, and the other part is a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

A system library may include a plurality of function modules, for example, a surface manager (surface manager), a media library (Media Libraries), a three-dimensional graphics processing library (for example, an open graphics library for embedded systems (open graphics library for embedded systems, OpenGL ES)), and a 2D graphics engine (for example, a skia graphics library (skia graphics library, SGL)).

The surface manager is configured to manage a display subsystem and provide fusion of 2D and 3D layers for a plurality of applications.

The media library supports play back and recording of audio in a plurality of formats. play back and recording of videos in a plurality of formats, and still image files. The media library may support a variety of audio and video encoding formats, for example, MPEG4, H.264, moving picture experts group audio layer III (moving picture experts group audio layer III, MP3), advanced audio coding (advanced audio coding, AAC), adaptive multi-rate (adaptive multi-rate, AMR), joint photographic experts group (joint photographic experts group, JPG), and portable network graphics (portable network graphics, PNG).

The three-dimensional graphics processing library may be configured to implement three-dimensional graphics drawing, image rendering, composition, and layer processing.

The two-dimensional graphics engine is a drawing engine for 2D drawings.

The kernel layer is a layer between hardware and software. The kernel layer may include drive modules such as a fingerprint module driver, a display driver, a camera driver, an audio driver, and a sensor driver.

The TEE layer may provide a security service for the Android system. The TEE layer is configured to perform various biometric recognition algorithms. The TEE layer is usually configured to perform key operations: (1) mobile payment; fingerprint verification. PIN code input. and the like; (2) secure storage of confidential data such as a private key and a certificate; and (3) content including: digital rights protection, digital rights management, or the like.

In some possible embodiments, the TEE layer includes a fingerprint input module and a fingerprint verification module. The fingerprint verification module includes a fingerprint matching module. Optionally, the fingerprint matching module may be independently disposed at the TEE layer, or may be located in the fingerprint verification module (for example, shown in FIG. 3). This is not specifically limited in this embodiment of this application.

In some embodiments, the fingerprint template matching module is configured to: obtain the features of the L key points of the first fingerprint image, where L is an integer greater than or equal to 2; determine the G pairs of key points based on the L key points of the first fingerprint image and the L key points of the first fingerprint template, where each pair of key points is a point pair formed when the key point of the first fingerprint image is matched with the key point of the first fingerprint template, the first distance parameter corresponding to each pair of key points is less than the first distance threshold, the first distance parameter is used to represent the distance between the key point of the first fingerprint image and the key point of the first fingerprint template, the features of the L key points of the first fingerprint template are stored in the fingerprint template library, and G is an integer less than or equal to L; sort the G pairs of key points based on the first distance parameter corresponding to each pair of key points; determine the N pairs of key points from the G pairs of key points that are sorted, where N is an integer less than or equal to G; determine the first rotation matrix using the N pairs of key points, where the first rotation matrix includes the translation parameter and the angle parameter, the angle parameter is used to represent the rotation angle of the first fingerprint image to the first fingerprint template, and the translation parameter is used to represent the translation distance of the first fingerprint image to the first fingerprint template; obtain the second fingerprint image, where the second fingerprint image is obtained by rotating the first fingerprint image based on the first rotation matrix, and the second fingerprint image is in the same direction as the first fingerprint template; and perform similarity matching using the second fingerprint image and the first fingerprint template.

For example, the fingerprint module is invoked by the fingerprint module driver in the kernel layer to acquire fingerprint data, and then the acquired fingerprint data is transmitted to the TEE layer for processing.

It should be understood that the foregoing uses an example to describe the diagram of the structure of the electronic device based on FIG. 2, and uses an example to describe the diagram of the software architecture in this embodiment of this application based on FIG. 3. However, this embodiment of this application is not limited thereto.

The following describes, with reference to FIG. 4 to FIG. 7, the fingerprint recognition method according to this embodiment of this application. It may be understood that the following fingerprint recognition method may be implemented in an electronic device (for example, the electronic device shown in FIG. 2) with the foregoing hardware structure.

Figure 4:
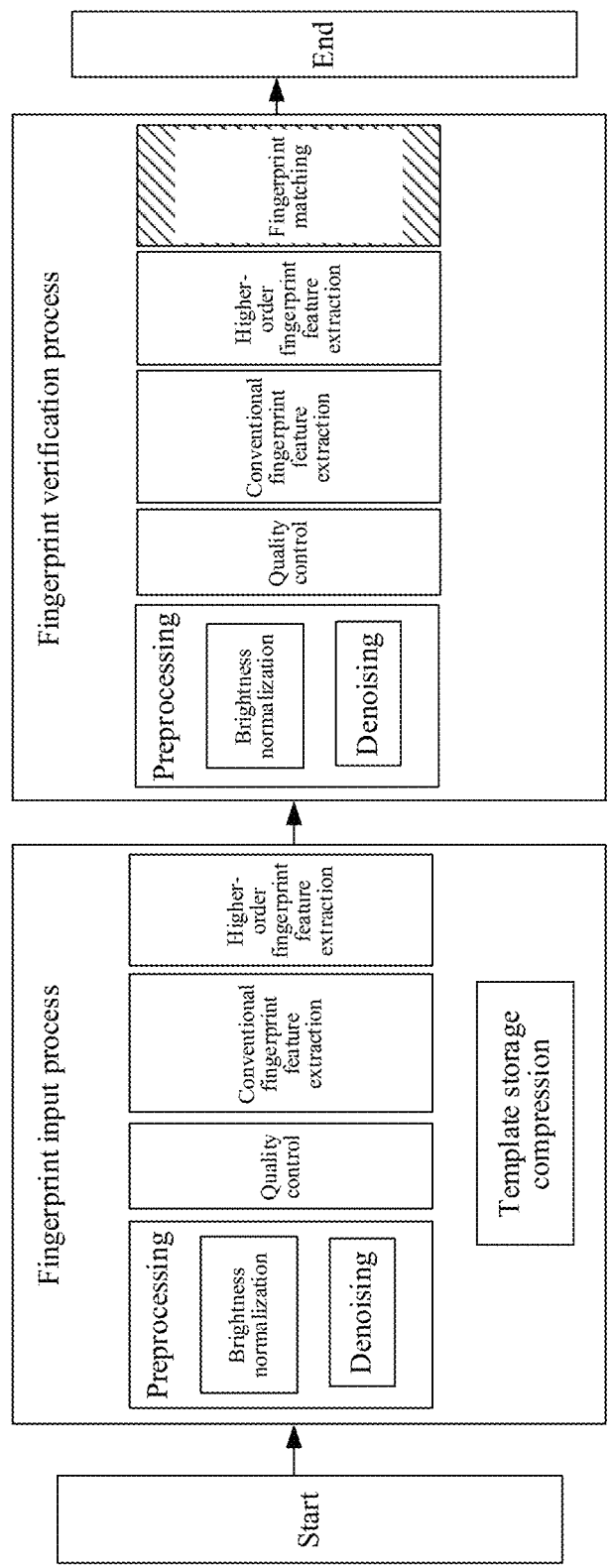
FIG. 4 is a schematic block diagram of a global process of fingerprint recognition.

FIG. 4 is a schematic block diagram of a global process of fingerprint recognition. As shown in FIG. 4, fingerprint recognition usually includes a fingerprint input process and a fingerprint verification process. For example, the fingerprint input process may be implemented by the fingerprint input module in FIG. 3, and the fingerprint verification process may be implemented by the fingerprint verification module and the fingerprint matching module in FIG. 3.

The fingerprint input process may be understood as a process of preprocessing an acquired fingerprint image of a user, performing feature extraction based on a preprocessed fingerprint image, and finally storing an extracted fingerprint feature as a fingerprint template.

For example, the fingerprint input process usually involves the following processing processes: preprocessing (including brightness normalization, denoising, and the like), quality control, conventional fingerprint feature extraction, higher-order fingerprint feature extraction, and template compression storage.

Preprocessing is an image processing process of performing brightness normalization, denoising, and the like on the acquired fingerprint image.

Denoising means performing image denoising processing on the fingerprint image to remove noise interference from the fingerprint image. A denoising method is not specifically limited in this embodiment of this application. For example, the denoising method is wavelet transform or bilateral filtering.

It should be understood that the foregoing merely uses an example in which preprocessing includes brightness normalization and denoising for description, and this embodiment of this application is not limited thereto. In fact, preprocessing may include other processing operations such as filtering processing, image enhancement, and binarization processing.

Quality control means determining image quality of the preprocessed fingerprint image, where a low-quality fingerprint image is filtered out, and a high-quality fingerprint image is obtained, to input the high-quality fingerprint image.

Conventional fingerprint feature extraction means preliminarily extracting a feature of a fingerprint based on a fingerprint image obtained through denoising. A conventional fingerprint feature may be understood as an overall fingerprint feature (or a global feature).

Higher-order fingerprint feature extraction means preliminarily extracting a fingerprint detail feature point from a detailed fingerprint map. A higher-order fingerprint feature may be understood as a local feature more detailed than the conventional fingerprint feature.

Template compression storage is a process of storing the extracted fingerprint feature. Generally, an extraction result of the fingerprint feature is stored as a feature template. In some embodiments, the fingerprint template stores the features of the L key points of the first fingerprint template.

In this embodiment of this application, the fingerprint verification process may be understood as a process of preprocessing a to-be-verified fingerprint image after the to-be-verified fingerprint image (for example, a first fingerprint image) is acquired, performing feature extraction based on a preprocessed to-be-verified fingerprint image, and obtaining features of L key points of the to-be-verified fingerprint image; then determining G pairs of key points based on the features of the L key points of the to-be-verified fingerprint image and features of L key points of a fingerprint template, where each pair of key point is a point pair formed when a key point of the to-be-verified fingerprint image is matched with a key point of the first fingerprint template, a first distance parameter corresponding to each pair of key point is less than a first distance threshold, and the first distance parameter is used to represent a distance between the key point of the to-be-verified fingerprint image and the key point of the first fingerprint template; next, sorting the G pairs of key points, and determining N pairs of key points from the G pairs of key points that are sorted; determining a first rotation matrix using the N pairs of key points; rotating the to-be-verified fingerprint image based on the first rotation matrix to obtain a second fingerprint image; and finally, performing, using the second fingerprint image, similarity matching on an extracted to-be-verified fingerprint feature and the fingerprint template.

For example, the fingerprint verification process involves the following processing processes: preprocessing (including brightness normalization, denoising, and the like), quality control, conventional fingerprint feature extraction, higher-order fingerprint feature extraction, and fingerprint matching.

For descriptions of preprocessing, denoising, quality control, conventional fingerprint feature extraction, and higher-order fingerprint feature extraction, refer to the descriptions in the fingerprint input process. For brevity, details are not described herein again.

For example, fingerprint matching is a process of matching the features of the L key points of the to-be-verified fingerprint image with the features of the L key points stored in the fingerprint template.

It should be understood that the schematic block diagram of the process shown in FIG. 4 is merely an example for description, and this embodiment of this application is not limited thereto.

Figure 5:
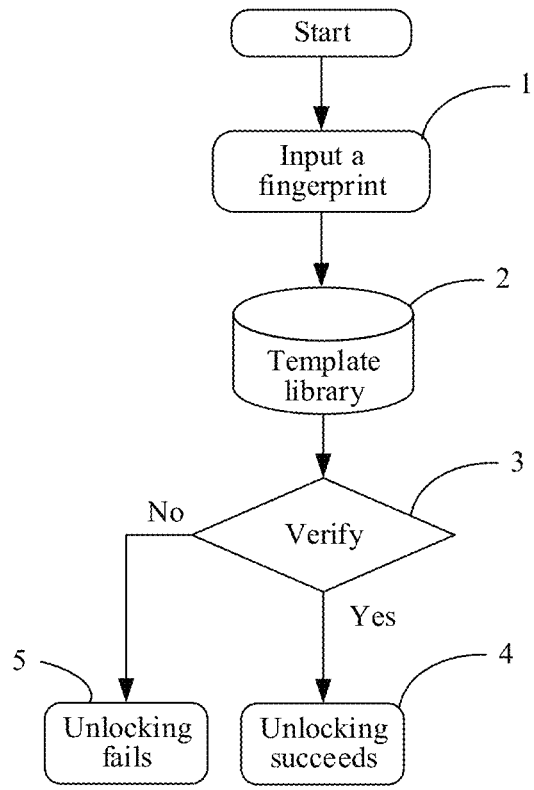
FIG. 5 is a diagram of a global process of fingerprint unlocking according to an embodiment of this application.

The following describes a global process of a fingerprint unlocking scenario with reference to FIG. 5. It should be understood that in FIG. 5, the fingerprint unlocking scenario is used as an example for illustration herein, but this embodiment of this application is not limited thereto. For example, fingerprint recognition may also be applied to a fingerprint payment scenario. As shown in FIG. 5, a fingerprint recognition process includes the following steps.

Step 1: Input a fingerprint.

Inputting the fingerprint may be understood as a process of acquiring a fingerprint feature of a user. For example, in an optical fingerprint scenario, the user inputs the fingerprint by pressing a fingerprint unlocking region (for example, the fingerprint unlocking region 10 shown in (1) in FIG. 1).

Step 2: Store a feature of a fingerprint image to a fingerprint template library (template library or fingerprint library for short).

The fingerprint template library may include one or more fingerprint templates.

It may be understood that an upper limit of a quantity of fingerprint templates stored in the fingerprint template library may be determined by implementation of an electronic device, which is not specifically limited. For example, a maximum of five fingerprints may be input to the fingerprint template library.

Optionally, the fingerprint template library may be stored at a trusted application (trusted application, TA) side of a TEE layer.

In this embodiment of this application, the fingerprint template library stores features of L key points of the fingerprint image.

Step 3: Verify (or match) a to-be-verified fingerprint image based on the fingerprint template stored in the fingerprint template library.

If the to-be-verified fingerprint image passes verification, step 4 is performed; or if the to-be-verified fingerprint image does not pass verification, step 5 is performed.

Step 4: Unlocking succeeds.

When the fingerprint input by the user is successfully matched with the fingerprint template stored in the fingerprint template library, the electronic device is successfully unlocked.

Step 5: Unlocking fails.

It should be understood that the process shown in FIG. 5 is merely an example for description, and this embodiment of this application is not limited thereto.

Figure 6:
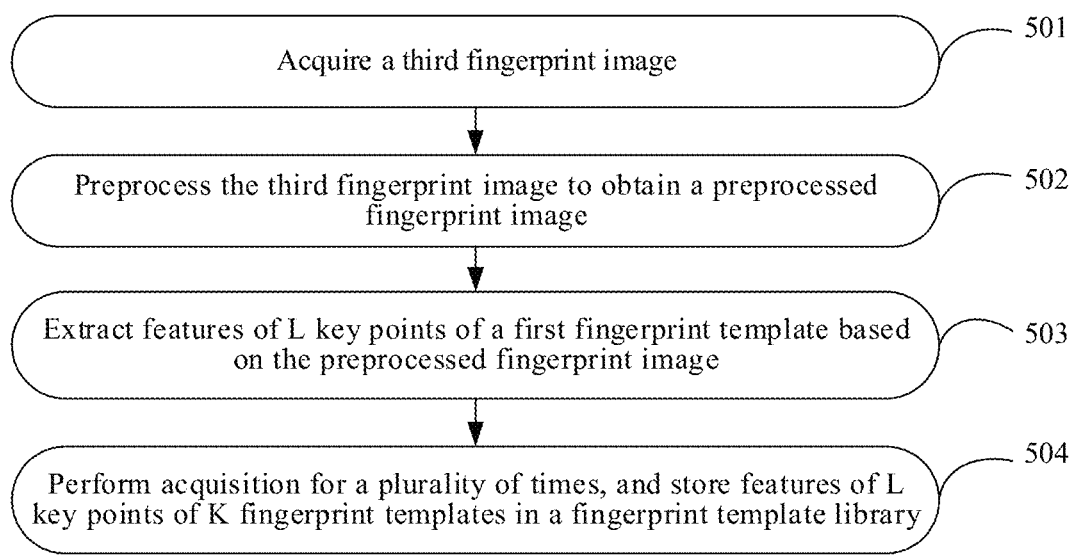
FIG. 6 is a schematic flowchart of a fingerprint input process according to an embodiment of this application.

The following describes, with reference to an example in FIG. 6, the fingerprint input process in the fingerprint recognition method according to this embodiment of this application. It should be understood that a method 500 shown in FIG. 6 may be implemented in combination with a method in FIG. 5, or may be implemented alone, which is not specifically limited. For example, the method in FIG. 6 may replace step 1 and step 2 in FIG. 5.

As shown in FIG. 6, the fingerprint input method includes the following steps.

Step 501: Acquire a third fingerprint image.

The third fingerprint image is generally used as a to-be-input fingerprint image or an acquired fingerprint image of a user. For example, the user presses a fingerprint unlocking region when inputting a fingerprint, and a fingerprint module acquires the fingerprint image based on pressing of the user.

Step 502: Preprocess the third fingerprint image to obtain a preprocessed fingerprint image.

A specific preprocessing method is not specifically limited in this embodiment of this application. In an implementation, for descriptions of a preprocessing process, refer to the descriptions in FIG. 4.

For example, the following preprocessing operations are performed on the third fingerprint image: brightness normalization, denoising, binarization, image enhancement, gray-scale processing, and the like.

It should be understood that processing operations included in the preprocessing process are not specifically limited in this embodiment of this application.

Step 503: Extract features of L key points of a first fingerprint template based on the preprocessed fingerprint image, where L is an integer greater than or equal to 1.

For example, after the preprocessed fingerprint image is obtained, fingerprint feature extraction is performed on the preprocessed fingerprint image to obtain all fingerprint features. The features of the L key points are selected from all the fingerprint features extracted. After the features of the L key points are extracted, the features of the L key points may be stored in a fingerprint template library in a form of the first fingerprint template, and not all feature points extracted after preprocessing need to be stored.

The key point may be understood as a feature point capable of representing a key fingerprint feature in a plurality of fingerprint feature points extracted. For example, the key point includes but is not limited to one or more of the following feature points: an endpoint or a bifurcation point of the fingerprint, or a fingerprint feature point extracted through a clear fingerprint line.

How to obtain the features of the L key points is not specifically limited in this embodiment of this application. For example. L key points with high clarities may be selected from the plurality of feature points based on clarities of the feature points in representing the fingerprint feature.

It should be understood that step 501 to step 503 are described with an example in which the third fingerprint image is acquired to input the first fingerprint template, and this embodiment of this application is not limited thereto. In fact, the user may input fingerprint images through a plurality of presses to input a plurality of fingerprint templates.

Step 504: Perform acquisition for a plurality of times, and store features of L key points of K fingerprint templates in the fingerprint template library.

For example, the fingerprint template library may store features of the K fingerprint templates. K is an integer greater than or equal to 1. For each of the K fingerprint templates, features of L key points may be stored.

For example, after each press of the user, the system acquires a current fingerprint image, and stores features of L key points of the current fingerprint image.

It should be understood that the fingerprint input method shown in FIG. 6 is merely an example for description, and this embodiment of this application is not limited thereto.

In conclusion, through the fingerprint input method shown in FIG. 6, features of L key points of a fingerprint template are stored. Compared with the conventional technology in which all the feature points extracted are stored in the fingerprint input process, the features of the L key points are stored in the fingerprint input method in this embodiment of this application, so that storage space occupied by the fingerprint template can be reduced, which helps save space of the electronic device.

The following describes, with reference to FIG. 7 to FIG. 11, the fingerprint recognition method according to this embodiment of this application.

Figure 7:
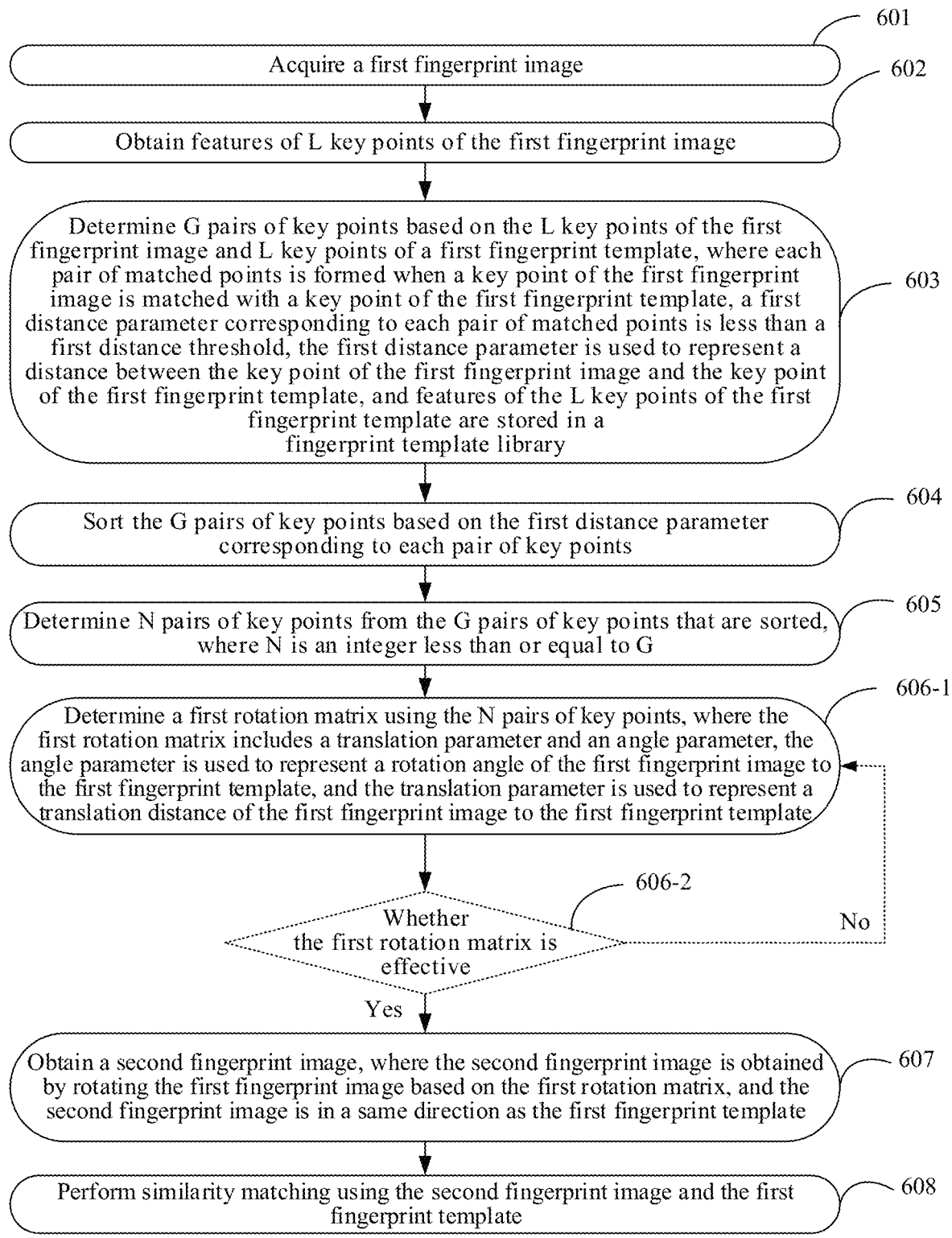
FIG. 7 is a schematic flowchart of a fingerprint recognition method according to an embodiment of this application.

FIG. 7 is a schematic flowchart of the fingerprint recognition method according to an embodiment of this application. It should be understood that the method shown in FIG. 7 may be implemented in combination with the method in FIG. 6, or may be implemented alone, which is not specifically limited. For example, for a method for inputting a first fingerprint template in FIG. 7, refer to the descriptions in FIG. 6.

As shown in FIG. 7, the method includes the following steps.

Step 601: Acquire a first fingerprint image.

The first fingerprint image is generally used as a to-be-verified fingerprint image or a to-be-matched fingerprint image. For example, when the user performs fingerprint unlocking, the first fingerprint image is an image acquired when the user presses a fingerprint unlocking region.

Step 602: Obtain features of L key points of the first fingerprint image, where L is an integer greater than or equal to 2.

For example, step 602 includes: preprocessing the first fingerprint image acquired to obtain a preprocessed fingerprint image, and then performing fingerprint feature extraction based on the preprocessed fingerprint image; and selecting the features of the L key points based on an extracted fingerprint feature.

For descriptions of the key point, refer to the descriptions of step 503 in FIG. 6. For brevity, details are not described herein again.

For example, for a preprocessing process, reference may also be made to the descriptions in FIG. 4.

Step 603: Determine G pairs of key points based on the L key points of the first fingerprint image and L key points of a first fingerprint template, where each pair of key points is formed when a key point of the first fingerprint image is matched with a key point of the first fingerprint template, a first distance parameter corresponding to each pair of key points is less than a first distance threshold, the first distance parameter is used to represent a distance between the key point of the first fingerprint image and the key point of the first fingerprint template, features of the L key points of the first fingerprint template are stored in a fingerprint template library, and G is an integer less than or equal to L.

For descriptions of a process of inputting the first fingerprint template, refer to the descriptions in FIG. 6. For brevity, details are not described herein again.

The G pairs of key points are used to describe point pairs formed when the key points of the to-be-matched fingerprint image are matched with the key points of the fingerprint template. The G pairs of key points are effective key point pairs in the L pairs of key points. The G pairs of key points may also be referred to as G key point pairs, G effective matched point pairs, or the like.

For example, when the L key points of the first fingerprint image are traversed and compared with the L key points of the first fingerprint template, every two key points (including a key point of the first fingerprint image and a key point of the first fingerprint template) form a key point pair. In this case, the L pairs of key points may be traversed, and the G pairs of key points may be selected from the L pairs of key points.

When the key points are compared, each pair of key points may be evaluated through a corresponding distance parameter, and a key point pair whose distance parameter satisfies a specific condition is determined as an effective matched point pair or effective key point pair. For example, when a distance between a key point of the first fingerprint image and a key point of the first fingerprint template satisfies a specific preset condition, it is considered that a key point pair formed by the key point of the first fingerprint image and the key point of the first fingerprint template is an effective key point pair.

Optionally, that the distance between the key point of the first fingerprint image and the key point of the first fingerprint template satisfies the specific preset condition includes: the distance (which may be represented by a first distance parameter) between the key point of the first fingerprint image and the key point of the first fingerprint template is less than the first distance threshold.

It may be understood that the first distance threshold may be appropriately selected based on an actual requirement. This is not specifically limited in this embodiment of this application. Generally, a smaller first distance threshold indicates that the key point of the first fingerprint image is closer to the key point of the first fingerprint template.

It may be further understood that the preset condition is merely an example for description, and this application is not limited thereto. For example, that "the first distance parameter is less than the first distance threshold" may be replaced with that "the first distance parameter is within a preset distance interval".

Optionally; the distance between the key point of the first fingerprint image and the key point of the first fingerprint template may be represented by the first distance parameter.

A manner for calculating the distance between the key point of the first fingerprint image and the key point of the first fingerprint template is not specifically limited in this embodiment of this application. For example, the first distance parameter may be a Hamming distance. For another example, the first distance parameter may be a Euclidean distance.

For example, the Euclidean distance may be calculated through the following formula:

$$D1 = Sqrt[(x2-x1)\char`\^2 + (y2-y1)\char`\^2].$$

D1 represents the Euclidean distance between the key point of the first fingerprint image and the key point of the first fingerprint template. Sqrt represents a rooting operation. (x1, y1) represents pixel coordinates corresponding to the key point of the first fingerprint image. (x2, y2) represents pixel coordinates corresponding to the key point of the first fingerprint template.

For example, the Hamming distance may be calculated through the following formula:

$$D2 = \text{abs}(x2 - x1) + \text{abs}(y2 - y1).$$

D2 represents the Hamming distance between the key point of the first fingerprint image and the key point of the first fingerprint template, abs represents an absolute value calculation operation, (x1, y1) represents pixel coordinates corresponding to the key point of the first fingerprint image, and (x2, y2) represents pixel coordinates corresponding to the key point of the first fingerprint template.

It should be understood that the foregoing expressions for the Euclidean distance and the Hamming distance are merely examples for description, and this embodiment of this application is not limited thereto.

Step 604: Sort the G pairs of key points based on the first distance parameter corresponding to each pair of key points.

Optionally, the G pairs of key points are described based on values of the first distance parameters.

For example, the G pairs of key points are sorted in order of small to large values of the first distance parameters, and N pairs of key points ranked higher (or top-N key point pairs) are selected from the G pairs of key points that are sorted. The N pairs of key points ranked higher include N key points of the first fingerprint image and N key points of the first fingerprint template, which are corresponding. Selecting the N pairs of key points in this manner can select high-quality key points to prepare for subsequent calculation of a rotation matrix.

It should be understood that the foregoing sorting is merely an example for description, and a sorting manner is not specifically limited in this embodiment of this application. For example, the G pairs of key points may alternatively be sorted in order of large to small values of the first distance parameters, and N pairs of key points ranked lower are selected from the G pairs of key points that are sorted.

It should be understood that no matter which sorting manner is used, the N pairs of key points finally selected are N pairs of key points whose first distance parameters are smallest in the G pairs of key points.

Step 605: Determine the N pairs of key points from the G pairs of key points that are sorted, where N is an integer less than or equal to G.

The N pairs of key points include the N key points of the first fingerprint image and the N key points of the first fingerprint template, which are corresponding.

After the N pairs of key points are obtained, the N pairs of key points may be used to calculate the rotation matrix. In other words, the N key points of the first fingerprint image and the N key points of the first fingerprint template, which are corresponding, in the N pairs of key points are used to calculate the rotation matrix.

Step 606-1: Determine a first rotation matrix using the N pairs of key points, where the first rotation matrix includes a translation parameter and an angle parameter, the angle parameter is used to represent a rotation angle of the first fingerprint image to the first fingerprint template, and the translation parameter is used to represent a translation distance of the first fingerprint image to the first fingerprint template.

The first rotation matrix is used to rotate the first fingerprint image to a same direction as the first fingerprint template. For example, during fingerprint recognition, there is a specific deviation (including a deviation in angle and/or displacement) between a direction in which a finger of the user is placed in the fingerprint unlocking region and a direction of the fingerprint template, for example, a location at which the finger is placed is inclined relative to a horizontal direction. In this case, a deviation between the two directions may be represented by the first rotation matrix, and the first fingerprint image is rotated to the direction of the first fingerprint template through the first rotation matrix.

Optionally, the first rotation matrix may include the translation parameter and the angle parameter. The translation parameter may include a horizontal translation parameter and a vertical translation parameter. The horizontal translation parameter is used to represent a horizontal translation distance of the first fingerprint image to the first fingerprint template. The vertical translation parameter is used to represent a vertical translation distance of the first fingerprint image to the first fingerprint template.

For example, the first rotation matrix is represented by $\Delta X$, $\Delta Y$, and $\theta$. $\Delta X$ represents the horizontal translation parameter. $\Delta Y$ represents the vertical translation parameter. $\theta$ represents the angle parameter.

For example, an example of the first rotation matrix is as follows:

$$\begin{bmatrix} \cos\theta & -\sin\theta & \Delta x \\ \sin\theta & \cos\theta & \Delta y \\ 0 & 0 & 1 \end{bmatrix}.$$

The example of the rotation matrix may be understood as a three-dimensional rotation matrix.

Optionally, determining the first rotation matrix using the N pairs of key points includes: calculating the first rotation matrix based on the N key points of the first fingerprint image and the N key points of the first fingerprint template.

For example, the first rotation matrix may be calculated based on pixel coordinates of the N key points of the first fingerprint image and pixel coordinates the N key points of the first fingerprint template. For a specific generation manner for the first rotation matrix, refer to a current method. This is not specifically limited in this embodiment of this application.

It should be understood that the foregoing descriptions of the first rotation matrix are example descriptions, and this embodiment of this application is not limited thereto. In fact, based on the foregoing example, a person skilled in the art may obtain the first rotation matrix in another appropriate manner.

After the first rotation matrix is obtained, effectiveness of the first rotation matrix may be further determined, which may improve reliability of a fingerprint verification process. Determining the effectiveness of the first rotation matrix can filter out a case in which the first rotation matrix is ineffective, to avoid execution of a subsequent conversion step using an ineffective rotation matrix. In addition, the to-be-verified fingerprint image is rotated using the first rotation matrix only when the first rotation matrix is effective, and a fingerprint image obtained through rotation is used for similarity matching. This can reduce a fail accept (fail accept, FA) risk to greatly reduce a fail accept rate (fail accept rate, FAR), or can reduce a false reject rate (false reject rate, FRR).

It should be understood that the FA, FAR, or FRR is used as an example of a parameter for evaluating performance of a fingerprint recognition algorithm, and this embodiment of this application is not limited thereto. A person skilled in the art knows specific significance of the FA, FAR, or FRR parameter in the fingerprint recognition algorithm.

Optionally; after step 606-1, the method shown in FIG. 7 further includes the following steps.

Step 606-2: Determine, based on the angle parameter and the translation parameter, whether the first rotation matrix is effective.

When the first rotation matrix is ineffective, another first rotation matrix is determined using the N pairs of key points.

When the first rotation matrix is effective, step 607 is performed, that is, the first fingerprint image is rotated based on the first rotation matrix to obtain a second fingerprint image.

For example, the effectiveness of the first rotation matrix may be determined in combination with the angle parameter and the translation parameter. If it is determined that the first rotation matrix is ineffective, step 606-1 is performed to recalculate the first rotation matrix.

Step 607: Obtain the second fingerprint image, where the second fingerprint image is obtained by rotating the first fingerprint image based on the first rotation matrix, and the second fingerprint image is in the same direction as the first fingerprint template.

Step 607 may be replaced with: rotating the first fingerprint image based on the first rotation matrix to obtain the second fingerprint image, where the second fingerprint image is in the same direction as the first fingerprint template.

In other words, the first fingerprint image may be rotated to the direction of the first fingerprint template for matching or similarity comparison between the first fingerprint image and the first fingerprint template.

Step 608: Perform similarity matching using the second fingerprint image and the first fingerprint template.

For example, similarity determining may be performed based on L key points of the second fingerprint image and the L key points of the first fingerprint template. The L key points of the second fingerprint image may be L key points obtained by converting the L key points of the first fingerprint image based on the first rotation matrix.

It may be understood that the foregoing uses an example in which the first fingerprint image is matched with the first fingerprint template for description. For another fingerprint template in the fingerprint template library, reference may also be made to a comparison process between the first fingerprint image and the first fingerprint template. For brevity, details are not described again.

In this embodiment of this application, the features of the L key points of the first fingerprint image are first obtained. Then, the G pairs of key points are determined based on the features of the L key points of the to-be-verified fingerprint image and the features of the L key points of the fingerprint template. Each pair of key point is formed when the key point of the first fingerprint image is matched with the key point of the first fingerprint template. The first distance parameter corresponding to each pair of key point is less than the first distance threshold. The first distance parameter is used to represent the distance between the key point of the first fingerprint image and the key point of the first fingerprint template. Next, the G pairs of key points are sorted. and the N pairs of key points are determined from the G pairs of key points that are sorted. Later on, the first rotation matrix is determined using the N pairs of key points, and the to-be-verified fingerprint image is rotated based on the first rotation matrix to obtain the second fingerprint image. Finally, similarity matching is performed using the second fingerprint image on an extracted to-be-verified fingerprint feature and the fingerprint template. This process helps increase a fingerprint recognition speed, and greatly improves user experience in fingerprint recognition.

Optionally, the method shown in FIG. 7 further includes the following steps:

when the second fingerprint image is not successfully matched with the first fingerprint template, performing matching using the first fingerprint image and a second fingerprint template in the fingerprint template library, where features of L key points of the second fingerprint template are stored in the fingerprint template library.

In other words, if the to-be-verified fingerprint image is not successfully matched with the first fingerprint template after converted through the first rotation matrix, an attempt may be made to match the to-be-verified fingerprint image with another fingerprint template (for example. the second fingerprint template) in the fingerprint template library for fingerprint recognition. Certainly, a method similar to that used for matching with the first fingerprint template may be used for matching with the another fingerprint template. The fingerprint template library may store a plurality of fingerprint templates, and features of L key points of each fingerprint template are stored. In the fingerprint verification process, the fingerprint templates stored in the fingerprint template library may be traversed until the first fingerprint image is successfully matched.

Step 603 is used to obtain the G pairs of key points. Optionally, step 603 may be replaced with step 603-A to step 603-D shown in FIG. 8. The following describes a specific process example with reference to a method in FIG. 8. It should be understood that for terms or concepts involved in FIG. 8, refer to the foregoing descriptions of step 603. For brevity, details are not described below again.

Figure 8:
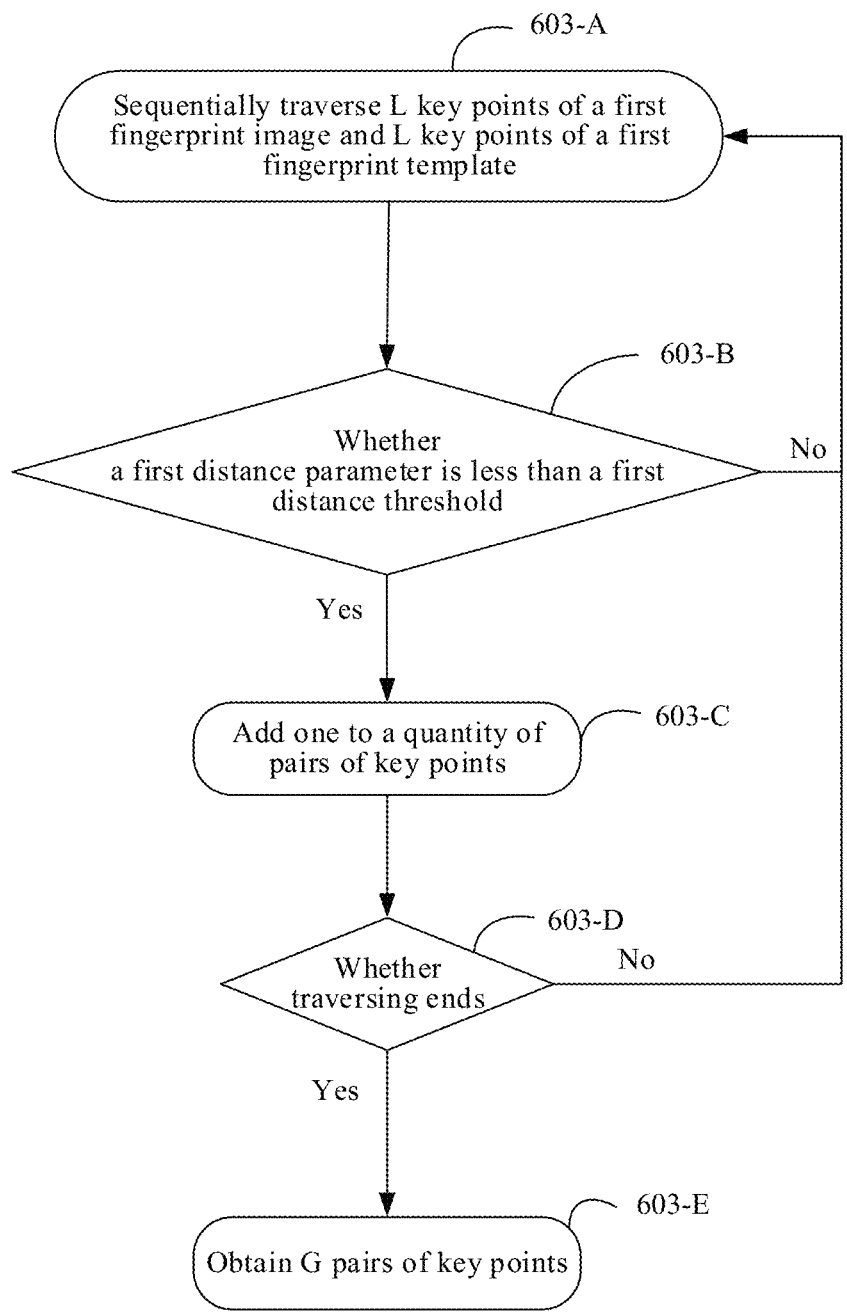
FIG. 8 is another schematic flowchart of a fingerprint recognition method according to an embodiment of this application.

As shown in FIG. 8, the process includes the following steps.

Step 603-A: Sequentially traverse the L key points of the first fingerprint image and the L key points of the first fingerprint template.

Step 603-B: Determine whether the first distance parameter is less than the first distance threshold.

For descriptions of the first distance parameter and the first distance threshold, refer to the foregoing descriptions. Details are not described herein again.

Step 603-C: Add one to a quantity of pairs of key points, or add one to a quantity of key point pairs.

It may be understood that step 603-C is used to collect statistics on a quantity of key point pairs whose first distance parameters are less than the first distance threshold. In other words, for the key point pairs whose first distance parameters are less than the first distance parameter, one may be added to the quantity of pairs of key points.

Step 603-D: Determine whether traversing ends.

After traversing ends, step 603-E may be performed; or when traversing does not end, step 603-A may be performed for traversing.

It may be understood that: that traversing ends means that the L key points of the first fingerprint image and the L key points of the first fingerprint template are all compared one by one.

Step 603-E: Obtain the G pairs of key points.

It should be understood that the process shown in FIG. 8 is merely for ease of understanding, and this embodiment of this application is not limited thereto.

This embodiment of this application further provides a specific method for determining the effectiveness of the first rotation matrix. The following describes in detail the method for determining the effectiveness of the first rotation matrix.

Figure 9:
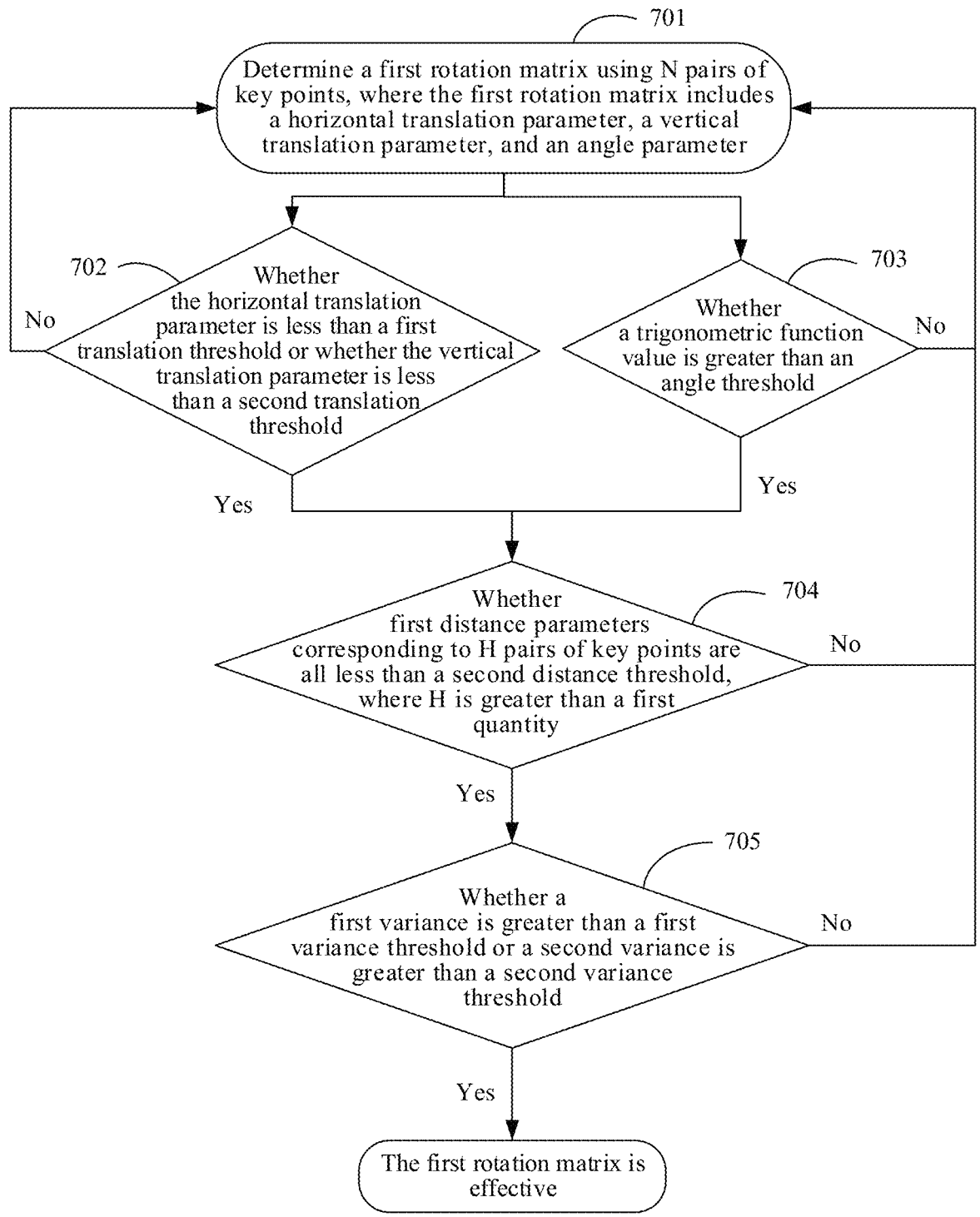
FIG. 9 is a schematic flowchart of determining effectiveness of a first rotation matrix according to an embodiment of this application.

FIG. 9 shows an example process of determining the effectiveness of the first rotation matrix. It should be understood that the process shown in FIG. 9 may be implemented in combination with the method in FIG. 7, or may be implemented alone, which is not specifically limited. For example, step 701 shown in FIG. 9 may replace step 606-1 in FIG. 7, and step 702 to step 705 shown in FIG. 9 may replace step 606-2 in FIG. 7. It should be further understood that for terms or concepts involved in FIG. 9, refer to the foregoing descriptions in FIG. 7. For brevity, details are not described below again.

As shown in FIG. 9, the process includes the following steps.

Step 701: Determine the first rotation matrix using the N pairs of key points, where the first rotation matrix includes the horizontal translation parameter, the vertical translation parameter, and the angle parameter.

For descriptions of step 701, refer to the descriptions of step 606-1. For brevity, details are not described herein again.

Step 702: Determine whether the horizontal translation parameter is less than a first translation threshold or whether the vertical translation parameter is less than a second translation threshold.

For example, whether ΔX is less than the first translation threshold is determined, or whether ΔY is less than the second translation threshold is determined.

Optionally, the first translation threshold and the second translation threshold may be set to a same value or different values. This is not specifically limited.

It may be understood that if the horizontal translation parameter is less than the first translation threshold or the vertical translation parameter is less than the second translation threshold, it indicates that the translation distance of the first fingerprint image to the first fingerprint template is short. Step 702 is one of determining factors for verifying the effectiveness of the first rotation matrix.

It may be further understood that a value of the first translation threshold or the second translation threshold may be set based on an actual requirement. This is not specifically limited in this embodiment of this application.

Step 703: Determine whether a trigonometric function value is greater than an angle threshold, where the trigonometric function value is determined based on the angle parameter.

For example, the trigonometric function value is a cosine function value. When the angle changes in an interval (0, π), cosθ is a decreasing function. Whether cosθ is greater than the angle threshold is determined. If cosθ is greater than the angle threshold, it indicates that the rotation angle of the first fingerprint image to the first fingerprint template is small. Step 703 is one of determining factors for verifying the effectiveness of the first rotation matrix.

It should be understood that a value of the angle threshold may be set based on the actual requirement. This is not specifically limited in this embodiment of this application.

It should be further understood that the foregoing merely uses a cosine function as an example for description, and this embodiment of this application is not limited thereto. In fact, a person skilled in the art may appropriately select another type of trigonometric function based on the foregoing descriptions.

Optionally, when determining conditions in step 702 and step 703 are both satisfied. step 704 may be further performed to determine whether some feature points are actually translated or rotated.

Step 704: When the horizontal translation parameter is less than the first translation threshold and the trigonometric function value is greater than the angle threshold, or when the vertical translation parameter is less than the second translation threshold and the trigonometric function value is greater than the angle threshold, determine whether first distance parameters corresponding to H pairs of key points are all less than a second distance threshold, where H is greater than a first quantity, and H is an integer less than or equal to N.

For example, when ΔX is less than the first translation threshold and cosθ is greater than the angle threshold, whether the first distance parameters corresponding to the H pairs of key points are all less than the second distance threshold continues to be determined, where H is greater than the first quantity.

For example, when ΔY is less than the first translation threshold and cosθ is greater than the angle threshold, whether the first distance parameters corresponding to the H pairs of key points are all less than the second distance threshold continues to be determined, where H is greater than the first quantity.

Step 704 is introduced to determine whether some key points actually participate in translation or rotation. Step 704 is one of determining factors for verifying the effectiveness of the first rotation matrix.

It may be understood that the first quantity may be set based on the actual requirement. This is not specifically limited in this embodiment of this application.

Optionally, when determining conditions in step 702 to step 704 are all satisfied, step 705 may be further performed for analysis in combination with an intrinsic point variance.

Step 705: When the second distance parameters corresponding to the H pairs of key points are all less than the second distance threshold, determine whether a first variance is greater than a first variance threshold or whether a second variance is greater than a second variance threshold.

The first variance is a variance of feature points in the horizontal direction (or an X-axis direction). The first variance is used to measure a discrete degree of data in the horizontal direction. A larger value of the first variance indicates that the data in the X-axis direction is more discrete, and this case is not recommended.

For example, the first variance may be calculated through the following formula:

$$\sigma^2 = \frac{\sum_{i=1}^{N}(X_1^i - X_2^i)^2}{N}.$$

$\sigma^2$ represents the first variance. $X_1^i$ represents the key feature point of the first fingerprint image. $X_2^i$ represents the key feature point of the first fingerprint template. N represents a quantity of key points.

The second variance is a variance of feature points in a vertical direction (or a Y-axis direction). The second variance is used to measure a discrete degree of data in the vertical direction. A larger value of the second variance indicates that the data in the X-axis direction is more discrete, and this case is not recommended. For a calculation manner for the second variance, reference may be made to the descriptions of the first variance. For brevity, details are not described herein again.

In step 705, the discrete degree of the data is determined by introducing a variance. Step 705 is one of determining factors for verifying the effectiveness of the first rotation matrix.

For example, when the first variance is greater than the first variance threshold or the second variance is greater than the second variance threshold, it is determined that the first rotation matrix is effective.

For example, when the first variance is not greater than the first variance threshold and the second variance is not greater than the second variance threshold, it is determined that the first rotation matrix is ineffective.

It should be understood that the first variance threshold or the second variance threshold may be set based on the actual requirement. This is not specifically limited in this embodiment of this application.

When it is determined that the first rotation matrix is ineffective, step 701 may be performed, that is, another first rotation matrix is determined.

Therefore, the process shown in FIG. 9 makes it possible to determine the effectiveness of the first rotation matrix.

It should be understood that the determining steps or determining factors shown in FIG. 9) may be partially combined for implementation, or may be all implemented, and this embodiment of this application is not limited thereto. Based on the method shown in FIG. 9, a person skilled in the art may combine the determining steps to obtain other solutions for determining the effectiveness of the first rotation matrix. All these solutions fall within the protection scope of this embodiment of this application.

For step 608 in FIG. 7, this embodiment of this application further provides a specific method for similarity determining. The following makes descriptions with reference to FIG. 10 and FIG. 11.

Figure 10:
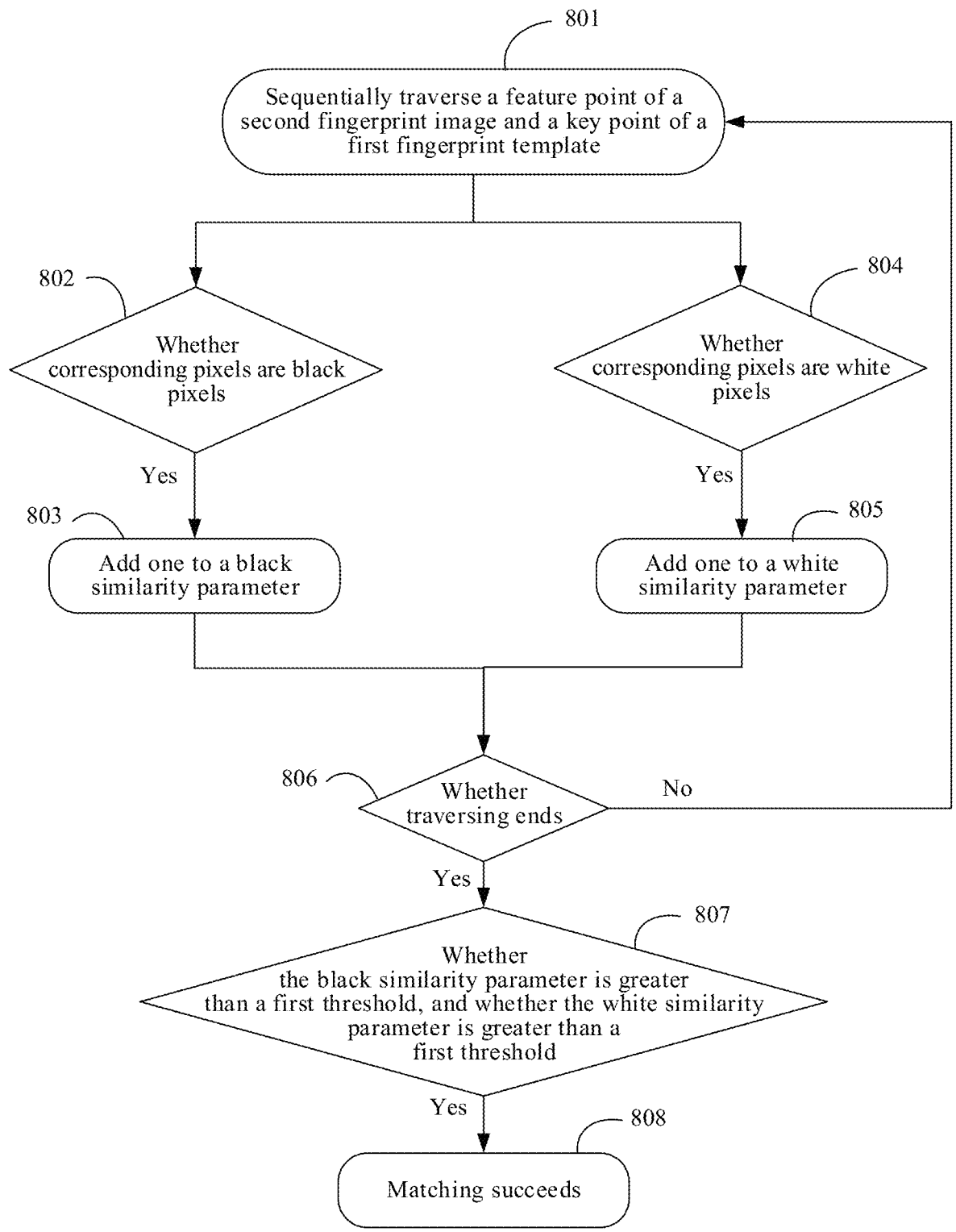
FIG. 10 is a schematic flowchart of a similarity determining method according to an embodiment of this application.

FIG. 10 shows a schematic process of a similarity determining method according to an embodiment of this application. It should be understood that the process shown in FIG. 10 may be implemented in combination with the method in FIG. 7, or may be implemented alone, which is not specifically limited. For example, step 801 to step 808 shown in FIG. 10 may replace step 608 in FIG. 7. It should be further understood that for terms or concepts involved in FIG. 10, refer to the foregoing descriptions in FIG. 7. For brevity, details are not described below again.

As shown in FIG. 10, the process includes the following steps.

Step 801: Sequentially traverse the L key points of the second fingerprint image and the L key points of the first fingerprint template.

The second fingerprint image or first fingerprint template herein is a binary image, that is, feature points included in this image include white pixels and black pixels. Therefore, corresponding pixels may be compared to perform similarity determining.

Step 802: Determine, based on the L key points of the second fingerprint image and the L key points of the first fingerprint template, whether corresponding pixels are black pixels.

For example, the "corresponding pixels" may be understood as pixels corresponding to a same pixel coordinate location.

Step 803: If the corresponding pixels are black pixels, add one to a black similarity parameter.

In other words, statistics on a quantity of corresponding pixels that are black pixels in the second fingerprint image and the first fingerprint template may be collected. For example, the quantity of corresponding pixels that are black pixels is represented by the black similarity parameter.

Step 804: Determine, based on the L key points of the second fingerprint image and the L key points of the first fingerprint template, whether corresponding pixels are white pixels.

Step 805: If the corresponding pixels are white pixels, add one to a white similarity parameter.

In other words, statistics on a quantity of corresponding pixels that are white pixels in the second fingerprint image and the first fingerprint template may be collected. For example, the quantity of corresponding pixels that are white pixels is represented by the white similarity parameter.

Step 806: Determine whether traversing ends.

If traversing does not end, step 801 is performed; or if traversing ends, step 807 is performed.

Step 807: Determine whether the black similarity parameter is greater than a first threshold and whether the white similarity parameter is greater than the second threshold, where the black similarity parameter is used to represent the quantity of corresponding pixels that are black in the second fingerprint image and the first fingerprint template, and the white similarity parameter is used to represent the quantity of corresponding pixels that are white in the second fingerprint image and the first fingerprint template.

Step 808: When the black similarity parameter is greater than the first threshold and the white similarity parameter is greater than the second threshold, determine that matching succeeds.

Through the process in FIG. 10, statistics on a total quantity of pixels that are black in the second fingerprint image and the first fingerprint template and a total quantity of pixels that are white in the second fingerprint image and the first fingerprint template is collected. When the total quantity of pixels that are black in the second fingerprint image and the first fingerprint template and the total quantity of pixels that are white in the second fingerprint image and the first fingerprint template are both greater than the corresponding thresholds, it is considered that the second fingerprint image is successfully matched with the first fingerprint template.

Compared with an existing matching manner, the foregoing black/white similarity determining manner can greatly improve recognition accuracy, reduce complexity in matching. reduce matching time, and significantly improve fingerprint recognition experience.

Figure 11:
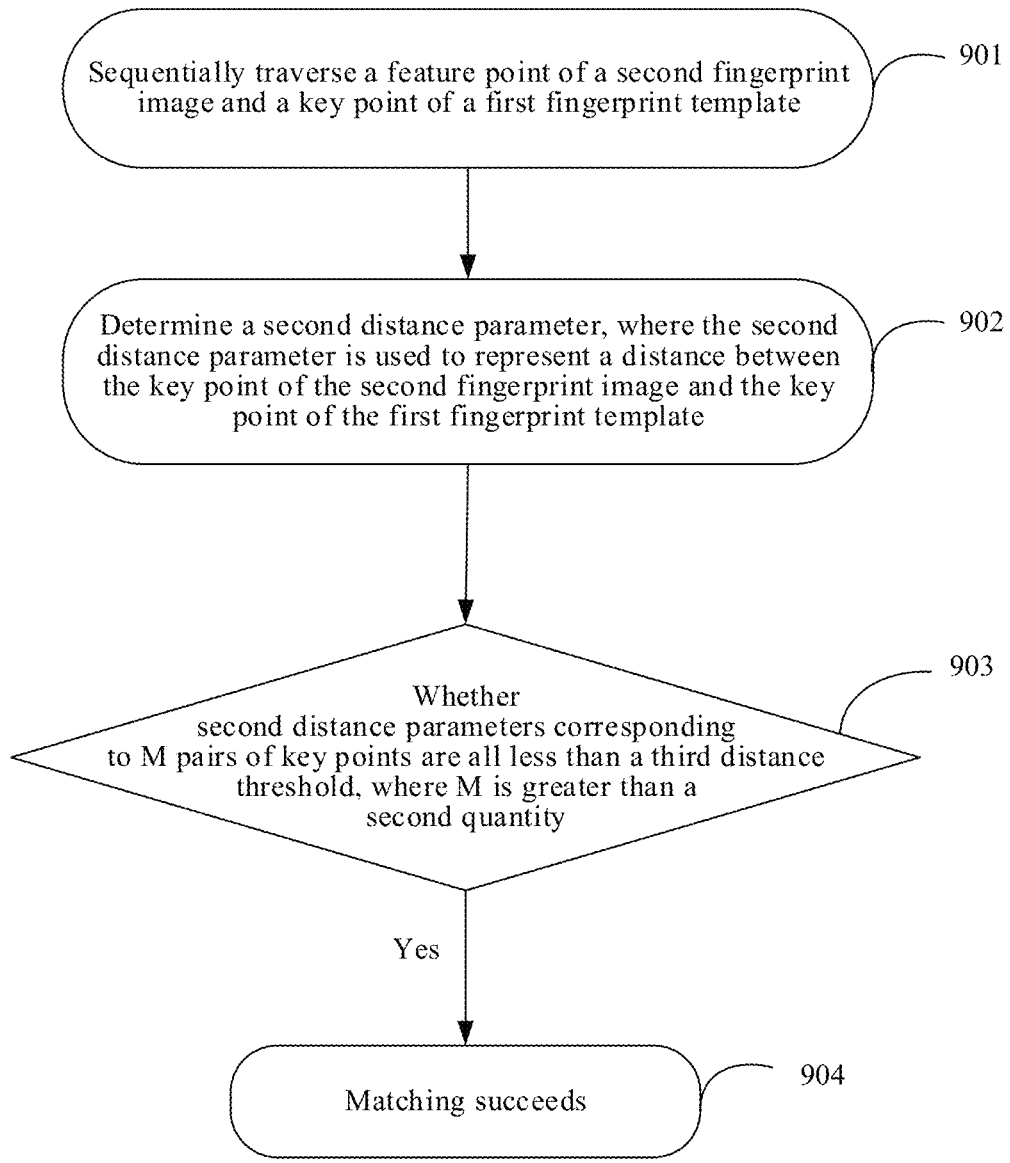
FIG. 11 is another schematic flowchart of a similarity determining method according to an embodiment of this application.

FIG. 11 shows a schematic process of another similarity determining method according to an embodiment of this application. It should be understood that the process shown in FIG. 11 may be implemented in combination with the method in FIG. 7, or may be implemented alone. which is not specifically limited. For example, step 901 to step 904 shown in FIG. 11 may replace step 608 in FIG. 7. It should be further understood that for terms or concepts involved in FIG. 11. refer to the foregoing descriptions in FIG. 7. For brevity, details are not described below again. As shown in FIG. 11, the process includes the following steps.

Step 901: Sequentially traverse the L key points of the second fingerprint image and the L key points of the first fingerprint template.

Step 902: Determine a second distance parameter, where the second distance parameter is used to represent a distance between a key point of the second fingerprint image and the key point of the first fingerprint template.

For descriptions of the second distance parameter, refer to the foregoing descriptions of the first distance parameter. For brevity, details are not described herein again.

For example, the second distance parameter may be a Euclidean distance or a Hamming distance.

Step 903: Determine whether second distance parameters corresponding to M pairs of key points are all less than a third distance threshold, where M is greater than a second quantity. M is an integer less than or equal to L.

For example, if second distance parameters corresponding to a specific quantity of (for example, M is greater than the second quantity) key point pairs are all less than a specific threshold (for example, the third distance threshold), it may be considered that the second fingerprint image is successfully matched with the first fingerprint template.

It may be understood that a value of the third distance parameter may be the same as or different from that of the first distance threshold. This is not specifically limited.

Step 904: When the second distance parameters corresponding to the M pairs of key points are all less than the third distance threshold, and M is greater than the second quantity, determine that matching succeeds.

Through the process in FIG. 11, statistics on a quantity of pairs of key points whose second distance parameters are less than the third distance threshold is collected. When the quantity of pairs of key points is greater than the second quantity, it is considered that the second fingerprint image is successfully matched with the first fingerprint template.

Compared with an existing matching manner, collecting the statistics on the quantity of pairs of key points whose second distance parameters are less than the third distance threshold for similarity determining helps reduce complexity in matching, reduce matching time, and significantly improve fingerprint recognition experience.

It should be understood that the similarity determining methods in FIG. 10 and FIG. 11 are merely examples for description, and this embodiment of this application is not limited thereto. In fact, after the second fingerprint image is obtained, another matching algorithm may be used to match the second fingerprint image with the first fingerprint template.

The foregoing fingerprint recognition method may be considered as a fingerprint matching optimization function in this embodiment of this application. In this embodiment of this application, the fingerprint matching optimization function may be solidified in a terminal, and does not need to be manually turned on by the user, or may be manually turned on or turned off by the user by providing an option. Optionally, this embodiment of this application further provides a switch option for the fingerprint matching optimization function, for the user to select to turn on or turn off the fingerprint matching optimization function.

Optionally, the method further includes: displaying a first interface. The first interface includes a first option. The first option is used to select to turn on or turn off the fingerprint matching optimization function.

The first interface is a fingerprint setting interface. It may be understood that how to enter the first interface is not specifically limited in this embodiment of this application. For example, the fingerprint setting interface may be entered through a setting application. For another example, the fingerprint setting interface may be entered through a fingerprint-related application.

For example, the switch option (corresponding to the first option) for fingerprint matching optimization may be added to the fingerprint setting interface.

Figure 12:
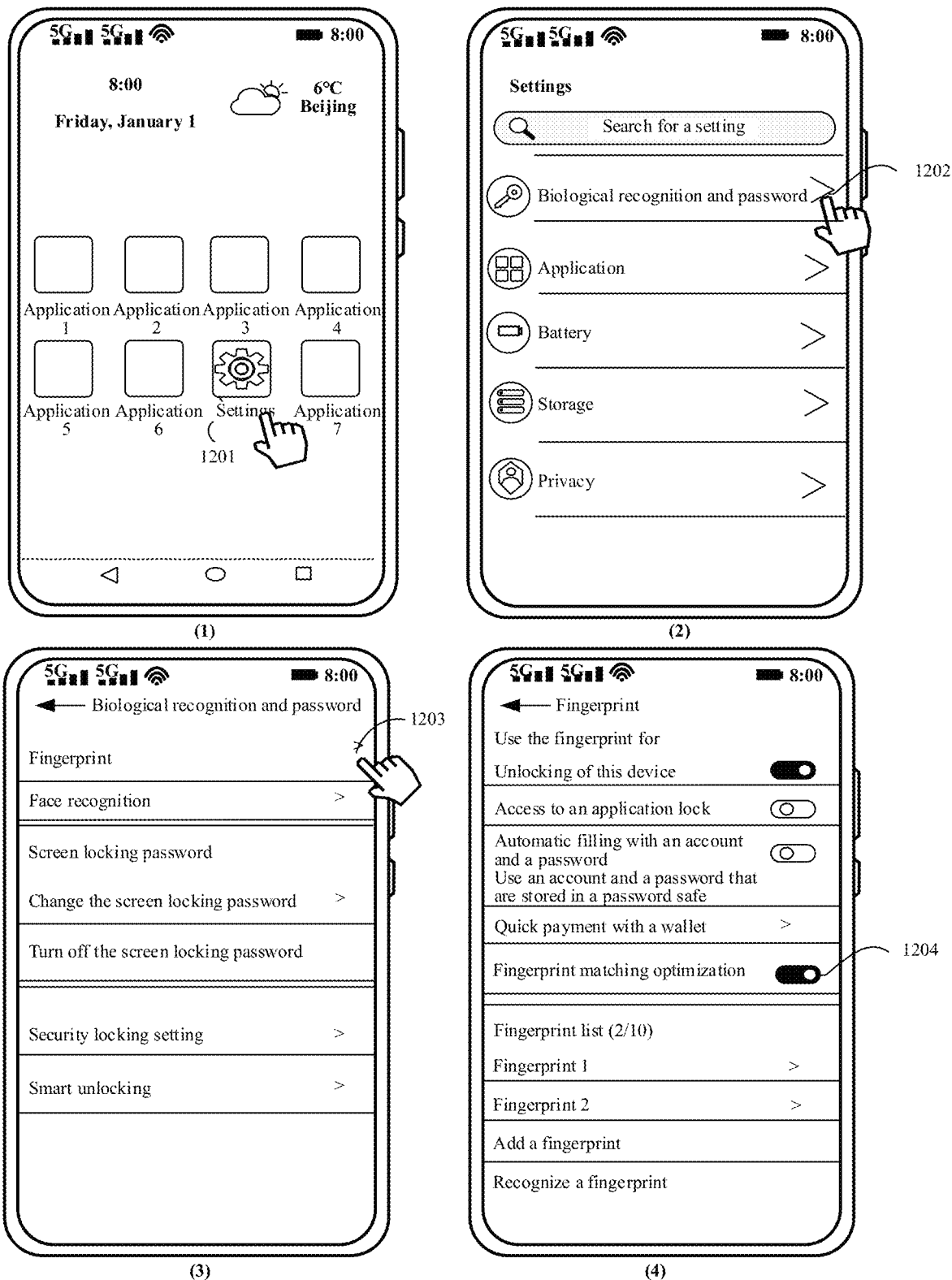
FIG. 12 is an example diagram of an interface according to an embodiment of this application.

FIG. 12 is an example diagram of an interface according to an embodiment of this application. As shown in (1) in FIG. 12, the user taps "Settings" 1201 to enter a setting interface. for example, an interface shown in (2) in FIG. 12. It may be understood that the interface shown in (1) in FIG. 12 may further include an icon of another application, for example, an application 1 to an application 7.

As shown in (2) in FIG. 12, the interface includes a biological device and password control 1202. It may be understood that the interface shown in (2) in FIG. 12 may further include another setting function, for example, an application setting, a battery setting, a storage setting, and a privacy setting shown in (2) in FIG. 12.

It may be understood that the setting options shown in (2) in FIG. 12 are merely examples of some setting functions, and this embodiment of this application is not limited thereto. It should be further understood that (2) in FIG. 12 further shows a setting search bar, and the user may search for a function setting fast through the setting search bar.

When the user taps the biological device and password control 1202, an interface shown in (3) in FIG. 12 is entered. As shown in (3) in FIG. 12, the interface includes a fingerprint setting control 1203.

Optionally, in addition to the fingerprint setting control 1203. (3) in FIG. 12 may further include a face recognition setting control, a screen locking password management control (including "Change the screen locking password" and "Turn off the screen locking password"), a security locking setting control, and a smart unlocking control. It should be understood that a biological recognition and password option shown in (3) in FIG. 12 is merely an example for description, and this embodiment of this application is not limited thereto.

After the user taps the fingerprint setting control 1203, an interface shown in (4) in FIG. 12 is displayed. As shown in (4) in FIG. 12, the interface includes a fingerprint matching optimization option 1204. The user may tap the fingerprint matching optimization option 1204 to turn on or turn off the fingerprint matching optimization function. For example, the fingerprint matching optimization option 1204 shown in (4) in FIG. 12 is on.

Optionally, in addition to the fingerprint matching optimization option 1204, (4) in FIG. 12 may further include another control for fingerprint management. For example, (4) in FIG. 12 shows fingerprint use options, including: an option that the fingerprint is used to unlock the device, an option that the fingerprint is used to access an application lock, an option that the fingerprint is used for automatic filling with an account and a password, and an option that the fingerprint is used for quick payment with a wallet. For another example, (4) in FIG. 12 shows a fingerprint list management option, including a management control for a fingerprint 1, a management control for a fingerprint 2, a fingerprint addition option, and a fingerprint recognition option.

It should be understood that an application scenario in FIG. 12 is merely for ease of understanding by a person skilled in the art, and is not intended to limit this embodiment of this application to the specific scenario in FIG. 12.

The foregoing describes, in detail with reference to FIG. 1 to FIG. 12, the fingerprint recognition method provided in this embodiment of this application. An apparatus embodiment of this application is described in detail below with reference to FIG. 13. It should be understood that a fingerprint recognition apparatus in this embodiment of this application may perform various fingerprint recognition methods in the foregoing embodiments of this application. In other words, for specific work processes of the following various products, refer to corresponding processes in the foregoing method embodiments.

Figure 13:
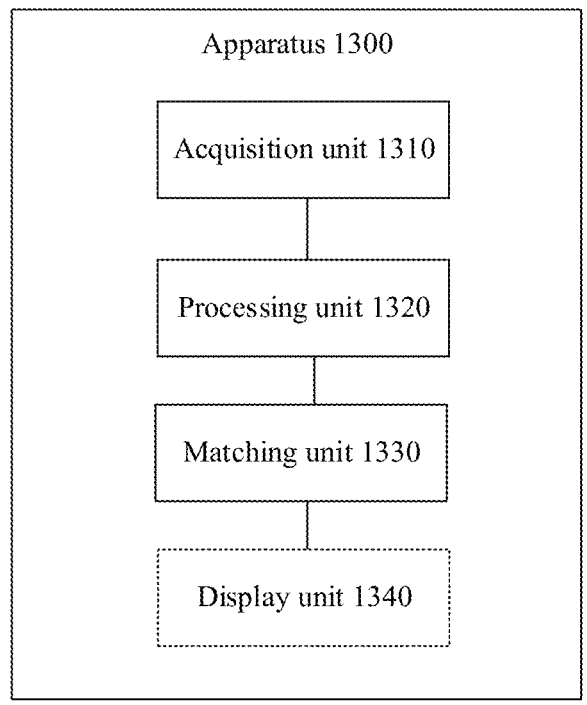
FIG. 13 is a schematic block diagram of a fingerprint recognition apparatus according to an embodiment of this application.

FIG. 13 is a schematic block diagram of a fingerprint recognition apparatus 1300 according to an embodiment of this application. It should be understood that the apparatus 1300 may perform the fingerprint recognition method shown in FIG. 4 to FIG. 12.

As shown in FIG. 13, the fingerprint recognition apparatus 1300 includes an acquisition unit 1310, a processing unit 1320, and a matching unit 1330. Optionally, the apparatus 1300 further includes a display unit 1340. In a possible example, the apparatus 1300 may be a terminal device.

In an example, the acquisition unit 1310 is configured to acquire a first fingerprint image.

The processing unit 1320 is configured to obtain features of L key points of the first fingerprint image, where L is an integer greater than or equal to 2.

The processing unit 1320 is further configured to determine G pairs of key points based on the L key points of the first fingerprint image and L key points of a first fingerprint template. Each pair of key points is a point pair formed when a key point of the first fingerprint image is matched with a key point of the first fingerprint template. A first distance parameter corresponding to each pair of key points is less than a first distance threshold. The first distance parameter is used to represent a distance between the key point of the first fingerprint image and the key point of the first fingerprint template. Features of the L key points of the first fingerprint template are stored in a fingerprint template library. G is an integer less than or equal to L.

The processing unit 1320 is further configured to sort the G pairs of key points based on the first distance parameter corresponding to each pair of key points.

The processing unit 1320 is further configured to determine N pairs of key points from the G pairs of key points that are sorted, where N is an integer less than or equal to G.

The processing unit 1320 is further configured to determine a first rotation matrix using the N pairs of key points. The first rotation matrix includes a translation parameter and an angle parameter. The angle parameter is used to represent a rotation angle of the first fingerprint image to the first fingerprint template. The translation parameter is used to represent a translation distance of the first fingerprint image to the first fingerprint template.

The processing unit 1320 is further configured to obtain a second fingerprint image. The second fingerprint image is obtained by rotating the first fingerprint image based on the first rotation matrix. The second fingerprint image is in a same direction as the first fingerprint template.

The matching unit 1330 is configured to perform similarity matching using the second fingerprint image and the first fingerprint template.

Optionally, in an embodiment, the processing unit 1320 is further configured to: before obtaining the second fingerprint image, determine, based on the angle parameter and the translation parameter, whether the first rotation matrix is effective; and when the first rotation matrix is ineffective, determine another first rotation matrix using the N pairs of key points; or when the first rotation matrix is effective, obtain the second fingerprint image.

Optionally, in an embodiment, the translation parameter includes a horizontal translation parameter and a vertical translation parameter. That the processing unit 1320 is configured to determine, based on the angle parameter and the translation parameter, whether the first rotation matrix is effective specifically includes:

determining whether the horizontal translation parameter is less than a first translation threshold or whether the vertical translation parameter is less than a second translation threshold;

determining whether a trigonometric function value is greater than an angle threshold, where the trigonometric function value is determined based on the angle parameter;

when the horizontal translation parameter is less than the first translation threshold and the trigonometric function value is greater than the angle threshold, or when the vertical translation parameter is less than the second translation threshold and the trigonometric function value is greater than the angle threshold, determining whether first distance parameters corresponding to H pairs of key points are all less than a second distance threshold, where H is greater than a first quantity, and H is an integer less than or equal to N;

when the second distance parameters corresponding to the H pairs of key points are all less than the second distance threshold, determining whether a first variance is greater than a first variance threshold or whether a second variance is greater than a second variance threshold; and when the first variance is greater than the first variance threshold or the second variance is greater than the second variance threshold, determining that the first rotation matrix is effective; or when the first variance is not greater than the first variance threshold and the second variance is not greater than the second variance threshold, determining that the first rotation matrix is ineffective.

Optionally, in an embodiment, that the processing unit 1320 is configured to sort the G pairs of key points based on the first distance parameter corresponding to each pair of key points specifically includes:

sorting the G pairs of key points in order of small to large values of the first distance parameters. The N pairs of key points are first N pairs of key points in the G pairs of key points that are sorted.

Optionally, in an embodiment, that the matching unit 1330 is configured to perform similarity comparison using the second fingerprint image and the first fingerprint template specifically includes:

sequentially traversing a key point of the second fingerprint image and the key point of the first fingerprint template;

determining whether a black similarity parameter is greater than a first threshold, where the black similarity parameter is used to represent a quantity of corresponding pixels that are black in the second fingerprint image and the first fingerprint template;

determining whether a white similarity parameter is greater than a second threshold, where the white similarity parameter is used to represent a quantity of corresponding pixels that are white in the second fingerprint image and the first fingerprint template; and when the black similarity parameter is greater than the first threshold and the white similarity parameter is greater than the second threshold, determining that matching succeeds.

Optionally, in an embodiment, that the matching unit 1330 is configured to perform similarity matching using the second fingerprint image and the first fingerprint template specifically includes:

determining a second distance parameter, where the second distance parameter is used to represent a distance between a key point of the second fingerprint image and the key point of the first fingerprint template;

determining whether second distance parameters corresponding to M pairs of key points are all less than a third distance threshold, where M is greater than a second quantity; and when the second distance parameters corresponding to the M pairs of key points are all less than the third distance threshold, determining that matching succeeds.

Optionally, in an embodiment, the processing unit 1320 is further configured to:

when the second fingerprint image is not successfully matched with the first fingerprint template, perform matching using the first fingerprint image and a second fingerprint template in the fingerprint template library, where features of L key points of the second fingerprint template are stored in the fingerprint template library.

Optionally, in an embodiment, the features of the L key points of the first fingerprint template are obtained in the following manner:

acquiring a third fingerprint image;

preprocessing the third fingerprint image to obtain a preprocessed fingerprint image; and extracting the features of the L key points of the first fingerprint template based on the preprocessed fingerprint image.

Optionally, in an embodiment, the display unit 1340 is configured to:

display a first interface, where the first interface includes a first option, and the first option is used to select to turn on or turn off a fingerprint matching optimization function.

In a possible example, the processing unit 1320 and the matching unit 1330 may be implemented by a processor or a processing unit. The display unit 1340 may be implemented by a screen. It should be understood that the apparatus 1300 is embodied in a form of a function unit. The term "unit" herein may be implemented in a form of software and/or hardware. This is not specifically limited in this embodiment of this application.

For example, the "unit" may be a software program, a hardware circuit, or a combination thereof for implementing the foregoing functions. The hardware circuit may include an application specific integrated circuit (application specific integrated circuit. ASIC), an electronic circuit, a processor (for example, a shared processor, a dedicated processor, or a processor group) and a memory for executing one or more software or firmware programs, an integrated logic circuit, and/or another proper device capable of providing the foregoing functions. In a simple embodiment, a person skilled in the art may figure out that the apparatus 1300 may use the form shown in FIG. 2.

A person of ordinary skill in the art may be aware that the units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

This application further provides a computer program product. When the computer program product is executed by a processor, the method in any method embodiment of this application is implemented.

The computer program product may be stored in a memory, and may be finally converted, after processing processes such as preprocessing, compiling, assembling, and linking, into an executable target file that can be executed by the processor.

This application further provides a computer-readable storage medium having a computer program stored thereon. When the computer program is executed by a computer, the method according to any method embodiment of this application is implemented. The computer program may be a high-level language program or an executable target program.

The computer-readable storage medium may be a volatile memory or non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not restrictive description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person of ordinary skill in the art may be aware that the units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division, and may be other division in actual implementation. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, a network device, or the like) to perform all or some of the steps of the method described in embodiments of this application. The storage medium includes any medium capable of storing program code, such as a USB flash drive, a removable hard disk, a read-only memory ROM, a random access memory RAM, a magnetic disk, or an optical disc.

It should be understood that sequence numbers of the processes do not mean execution sequences in various embodiments of this application. The execution sequences of the processes should be determined according to functions and internal logic of the processes, and should not constitute any limitation on the implementation processes of embodiments of this application.

In addition, the terms "system" and "network" in this specification may be used interchangeably in this specification. The term "and/or" used in this specification describes only an association relationship for describing associated objects and represents that three relationships may exist. For example, A and/or B may represent the following three cases: the following three cases: Only A exists, both A and B exist, and only B exists. In addition, the character "/" in this specification generally indicates an "or" relationship between the associated objects. For example. A/B may indicate A or B.

The terms (or numbers) "first", "second", and the like that appear in embodiments of this application are merely used for the purpose of description, that is, used to distinguish between different objects, for example, different "fingerprint images", and cannot be understood as an indication or implication of relative importance or an implicit indication of a quantity of indicated technical features. Therefore, a feature limited by "first", "second", and the like may explicitly or implicitly include one or more such features. In the descriptions of embodiments of this application. "at least one piece (item)" means one or more. "A plurality of" means two or more. "At least one piece (item) of the following" or a similar expression thereof means any combination of these items, including any combination of a single piece (item) or a plurality of pieces (items).

For example, unless otherwise specified, an expression such as "an item includes at least one of the following: A, B, and C" appearing in embodiments of this application usually means that the item may be any one of the following: A; B; C; A and B; A and C; B and C; A, B and C; A and A; A, A and A; A, A and B; A, A and C, A, and B and B; A, C and C; B and B, B, B and B, B, B and C, and C and C; and C, C and C, and another combination of A, B, and C. The three elements A, B, and C are used above as examples to illustrate an optional entry of the item. When the expression is "an item includes at least one of the following: A, B, . . . , and X", that is, when there are more elements in the expression, an applicable entry of the item may be obtained according to the foregoing rule.

In conclusion, the foregoing descriptions are merely example embodiments of the technical solutions of this application, and are not intended to limit the protection scope of this application. Any modification, equivalent replacement, and improvement made within the spirit and principle of this application shall fall within the protection scope of this application.

The invention claimed is:

1. A fingerprint recognition method, wherein the method is applied to an electronic device, and the method comprises:
   acquiring a first fingerprint image;
   obtaining features of L key points of the first fingerprint image, wherein L is an integer greater than or equal to 2;
   determining G pairs of key points based on the L key points of the first fingerprint image and L key points of a first fingerprint template, wherein each pair of key points is formed when a key point of the first fingerprint image is matched with a key point of the first fingerprint template, a first distance parameter corresponding to each pair of key points is less than a first distance threshold, the first distance parameter is used to represent a distance between the key point of the first fingerprint image and the key point of the first fingerprint template, features of the L key points of the first fingerprint template are stored in a fingerprint template library, and G is an integer less than or equal to L;
   sorting the G pairs of key points based on the first distance parameter corresponding to each pair of key points;
   determining N pairs of key points from the G pairs of key points that are sorted, wherein N is an integer less than or equal to G;
   determining a first rotation matrix using the N pairs of key points, wherein the first rotation matrix comprises a translation parameter and an angle parameter, the angle parameter is used to represent a rotation angle of the first fingerprint image to the first fingerprint template, and the translation parameter is used to represent a translation distance of the first fingerprint image to the first fingerprint template;
   obtaining a second fingerprint image, wherein the second fingerprint image is obtained by rotating the first fingerprint image based on the first rotation matrix, and the second fingerprint image is in a same direction as the first fingerprint template; and
   performing similarity matching using the second fingerprint image and the first fingerprint template.

2. The method according to claim 1, wherein before the obtaining a second fingerprint image, the method further comprises:
   determining, based on the angle parameter and the translation parameter, whether the first rotation matrix is effective; and when the first rotation matrix is ineffective, determining another first rotation matrix using the N pairs of key points; and the obtaining a second fingerprint image comprises:
when the first rotation matrix is effective, obtaining the second fingerprint image.

3. The method according to claim 2, wherein the translation parameter comprises a horizontal translation parameter and a vertical translation parameter; and the determining, based on the angle parameter and the translation parameter, whether the first rotation matrix is effective comprises:
determining whether the horizontal translation parameter is less than a first translation threshold or whether the vertical translation parameter is less than a second translation threshold;
determining whether a trigonometric function value is greater than an angle threshold, wherein the trigonometric function value is determined based on the angle parameter;
when the horizontal translation parameter is less than the first translation threshold and the trigonometric function value is greater than the angle threshold, or when the vertical translation parameter is less than the second translation threshold and the trigonometric function value is greater than the angle threshold, determining whether first distance parameters corresponding to H pairs of key points are all less than a second distance threshold, wherein H is greater than a first quantity, and H is an integer less than or equal to N;
when the second distance parameters corresponding to the H pairs of key points are all less than the second distance threshold, determining whether a first variance is greater than a first variance threshold or whether a second variance is greater than a second variance threshold; and
when the first variance is greater than the first variance threshold or the second variance is greater than the second variance threshold, determining that the first rotation matrix is effective; or
when the first variance is not greater than the first variance threshold and the second variance is not greater than the second variance threshold, determining that the first rotation matrix is ineffective.

4. The method according to claim 2, wherein the performing similarity matching using the second fingerprint image and the first fingerprint template comprises:
sequentially traversing a key point of the second fingerprint image and the key point of the first fingerprint template;
determining whether a black similarity parameter is greater than a first threshold, wherein the black similarity parameter is used to represent a quantity of corresponding pixels that are black in the second fingerprint image and the first fingerprint template;
determining whether a white similarity parameter is greater than a second threshold, wherein the white similarity parameter is used to represent a quantity of corresponding pixels that are white in the second fingerprint image and the first fingerprint template; and
when the black similarity parameter is greater than the first threshold and the white similarity parameter is greater than the second threshold, determining that matching succeeds.

5. The method according to claim 2, wherein the performing similarity matching using the second fingerprint image and the first fingerprint template comprises:

determining a second distance parameter, wherein the second distance parameter is used to represent a distance between a key point of the second fingerprint image and the key point of the first fingerprint template;
determining whether second distance parameters corresponding to M pairs of key points are all less than a third distance threshold, wherein M is greater than a second quantity; and
when the second distance parameters corresponding to the M pairs of key points are all less than the third distance threshold, determining that matching succeeds.

6. The method according to claim 2, wherein the features of the L key points of the first fingerprint template are obtained in the following manner:
acquiring a third fingerprint image;
preprocessing the third fingerprint image to obtain a preprocessed fingerprint image; and
extracting the features of the L key points of the first fingerprint template based on the preprocessed fingerprint image.

7. The method according to claim 3, wherein the performing similarity matching using the second fingerprint image and the first fingerprint template comprises:
sequentially traversing a key point of the second fingerprint image and the key point of the first fingerprint template;
determining whether a black similarity parameter is greater than a first threshold, wherein the black similarity parameter is used to represent a quantity of corresponding pixels that are black in the second fingerprint image and the first fingerprint template;
determining whether a white similarity parameter is greater than a second threshold, wherein the white similarity parameter is used to represent a quantity of corresponding pixels that are white in the second fingerprint image and the first fingerprint template; and
when the black similarity parameter is greater than the first threshold and the white similarity parameter is greater than the second threshold, determining that matching succeeds.

8. The method according to claim 3, wherein the performing similarity matching using the second fingerprint image and the first fingerprint template comprises:
determining a second distance parameter, wherein the second distance parameter is used to represent a distance between a key point of the second fingerprint image and the key point of the first fingerprint template;
determining whether second distance parameters corresponding to M pairs of key points are all less than a third distance threshold, wherein M is greater than a second quantity; and
when the second distance parameters corresponding to the M pairs of key points are all less than the third distance threshold, determining that matching succeeds.

9. The method according to claim 3, wherein the features of the L key points of the first fingerprint template are obtained in the following manner:
acquiring a third fingerprint image;
preprocessing the third fingerprint image to obtain a preprocessed fingerprint image; and
extracting the features of the L key points of the first fingerprint template based on the preprocessed fingerprint image.

10. The method according to claim 1, wherein the sorting the G pairs of key points based on the first distance parameter corresponding to each pair of key points comprises:

sorting the G pairs of key points in order of small to large values of the first distance parameters, wherein
the N pairs of key points are first N pairs of key points in the G pairs of key points that are sorted.

11. The method according to claim 10, wherein the performing similarity matching using the second fingerprint image and the first fingerprint template comprises:
sequentially traversing a key point of the second fingerprint image and the key point of the first fingerprint template;
determining whether a black similarity parameter is greater than a first threshold, wherein the black similarity parameter is used to represent a quantity of corresponding pixels that are black in the second fingerprint image and the first fingerprint template;
determining whether a white similarity parameter is greater than a second threshold, wherein the white similarity parameter is used to represent a quantity of corresponding pixels that are white in the second fingerprint image and the first fingerprint template; and
when the black similarity parameter is greater than the first threshold and the white similarity parameter is greater than the second threshold, determining that matching succeeds.

12. The method according to claim 10, wherein the performing similarity matching using the second fingerprint image and the first fingerprint template comprises:
determining a second distance parameter, wherein the second distance parameter is used to represent a distance between a key point of the second fingerprint image and the key point of the first fingerprint template;
determining whether second distance parameters corresponding to M pairs of key points are all less than a third distance threshold, wherein M is greater than a second quantity; and
when the second distance parameters corresponding to the M pairs of key points are all less than the third distance threshold, determining that matching succeeds.

13. The method according to claim 1, wherein the performing similarity matching using the second fingerprint image and the first fingerprint template comprises:
sequentially traversing a key point of the second fingerprint image and the key point of the first fingerprint template;
determining whether a black similarity parameter is greater than a first threshold, wherein the black similarity parameter is used to represent a quantity of corresponding pixels that are black in the second fingerprint image and the first fingerprint template;
determining whether a white similarity parameter is greater than a second threshold, wherein the white similarity parameter is used to represent a quantity of corresponding pixels that are white in the second fingerprint image and the first fingerprint template; and
when the black similarity parameter is greater than the first threshold and the white similarity parameter is greater than the second threshold, determining that matching succeeds.

14. The method according to claim 1, wherein the performing similarity matching using the second fingerprint image and the first fingerprint template comprises:
determining a second distance parameter, wherein the second distance parameter is used to represent a distance between a key point of the second fingerprint image and the key point of the first fingerprint template;
determining whether second distance parameters corresponding to M pairs of key points are all less than a third distance threshold, wherein M is greater than a second quantity; and
when the second distance parameters corresponding to the M pairs of key points are all less than the third distance threshold, determining that matching succeeds.

15. The method according to claim 1, wherein the method further comprises:
when the second fingerprint image is not successfully matched with the first fingerprint template, performing matching using the first fingerprint image and a second fingerprint template in the fingerprint template library, wherein features of L key points of the second fingerprint template are stored in the fingerprint template library.

16. The method according to claim 15, wherein the features of the L key points of the first fingerprint template are obtained in the following manner:
acquiring a third fingerprint image;
preprocessing the third fingerprint image to obtain a preprocessed fingerprint image; and
extracting the features of the L key points of the first fingerprint template based on the preprocessed fingerprint image.

17. The method according to claim 1, wherein the features of the L key points of the first fingerprint template are obtained in the following manner:
acquiring a third fingerprint image;
preprocessing the third fingerprint image to obtain a preprocessed fingerprint image; and
extracting the features of the L key points of the first fingerprint template based on the preprocessed fingerprint image.

18. The method according to claim 1, wherein the method further comprises:
displaying a first interface, wherein the first interface comprises a first option, and the first option is used to select to turn on or turn off a fingerprint matching optimization function.

19. An electronic device, comprising a processor and a memory, wherein the processor and the memory are coupled, the memory is configured to store a computer program, and when the computer program is executed by the processor, the electronic device is enabled to perform a method, the method comprising:
acquiring a first fingerprint image;
obtaining features of L key points of the first fingerprint image, wherein L is an integer greater than or equal to 2;
determining G pairs of key points based on the L key points of the first fingerprint image and L key points of a first fingerprint template, wherein each pair of key points is formed when a key point of the first fingerprint image is matched with a key point of the first fingerprint template, a first distance parameter corresponding to each pair of key points is less than a first distance threshold, the first distance parameter is used to represent a distance between the key point of the first fingerprint image and the key point of the first fingerprint template, features of the L key points of the first fingerprint template are stored in a fingerprint template library, and G is an integer less than or equal to L;
sorting the G pairs of key points based on the first distance parameter corresponding to each pair of key points;

determining N pairs of key points from the G pairs of key points that are sorted, wherein N is an integer less than or equal to G;

determining a first rotation matrix using the N pairs of key points, wherein the first rotation matrix comprises a translation parameter and an angle parameter, the angle parameter is used to represent a rotation angle of the first fingerprint image to the first fingerprint template, and the translation parameter is used to represent a translation distance of the first fingerprint image to the first fingerprint template:

obtaining a second fingerprint image, wherein the second fingerprint image is obtained by rotating the first fingerprint image based on the first rotation matrix, and the second fingerprint image is in a same direction as the first fingerprint template; and performing similarity matching using the second fingerprint image and the first fingerprint template.

20. A chip, comprising:

a processor, wherein when the processor executes instructions, the processor performs a method, the method comprising:

acquiring a first fingerprint image;

obtaining features of L key points of the first fingerprint image, wherein L is an integer greater than or equal to 2;

determining G pairs of key points based on the L key points of the first fingerprint image and L key points of a first fingerprint template, wherein each pair of key points is formed when a key point of the first fingerprint image is matched with a key point of the first fingerprint template, a first distance parameter corresponding to each pair of key points is less than a first distance threshold, the first distance parameter is used to represent a distance between the key point of the first fingerprint image and the key point of the first fingerprint template, features of the L key points of the first fingerprint template are stored in a fingerprint template library, and G is an integer less than or equal to L;

sorting the G pairs of key points based on the first distance parameter corresponding to each pair of key points;

determining N pairs of key points from the G pairs of key points that are sorted, wherein N is an integer less than or equal to G;

determining a first rotation matrix using the N pairs of key points, wherein the first rotation matrix comprises a translation parameter and an angle parameter, the angle parameter is used to represent a rotation angle of the first fingerprint image to the first fingerprint template, and the translation parameter is used to represent a translation distance of the first fingerprint image to the first fingerprint template;

obtaining a second fingerprint image, wherein the second fingerprint image is obtained by rotating the first fingerprint image based on the first rotation matrix, and the second fingerprint image is in a same direction as the first fingerprint template; and performing similarity matching using the second fingerprint image and the first fingerprint template.

\* \* \* \* \*